United States Patent
Kakoiyama

(10) Patent No.: US 9,513,182 B2
(45) Date of Patent: Dec. 6, 2016

(54) PRESSURE SENSOR HAVING MULTIPLE PIEZORESISTIVE ELEMENTS

(75) Inventor: Naoki Kakoiyama, Obu (JP)

(73) Assignee: DENSO CORPORATION, Kariya (JP)

( * ) Notice: Subject to any disclaimer, the term of this patent is extended or adjusted under 35 U.S.C. 154(b) by 168 days.

(21) Appl. No.: 14/397,871

(22) PCT Filed: Jul. 24, 2012

(86) PCT No.: PCT/JP2012/004697
§ 371 (c)(1),
(2), (4) Date: Oct. 30, 2014

(87) PCT Pub. No.: WO2014/002150
PCT Pub. Date: Jan. 3, 2014

(65) Prior Publication Data
US 2015/0128713 A1    May 14, 2015

(30) Foreign Application Priority Data
Jun. 29, 2012  (JP) .................................. 2012-147834

(51) Int. Cl.
*G01L 9/06* (2006.01)
*G01L 9/00* (2006.01)
*G01L 19/04* (2006.01)

(52) U.S. Cl.
CPC .......... *G01L 9/0052* (2013.01); *G01L 9/0055* (2013.01); *G01L 19/04* (2013.01)

(58) Field of Classification Search
None
See application file for complete search history.

(56) References Cited

U.S. PATENT DOCUMENTS

| 4,930,353 A | 6/1990 | Kato et al. |
| 5,181,417 A | 1/1993 | Nishida et al. |

(Continued)

FOREIGN PATENT DOCUMENTS

| JP | S55-029742 A | 3/1980 |
| JP | S61-154179 A | 7/1986 |

(Continued)

OTHER PUBLICATIONS

International Search Report of the International Searching Authority mailed Sep. 11, 2012 for the corresponding international application No. PCT/JP2012/004697 (with English translation).

(Continued)

*Primary Examiner* — Andre Allen
(74) *Attorney, Agent, or Firm* — Posz Law Group, PLC

(57) ABSTRACT

A pressure sensor includes: a sensor section having one fixed end and first to four gauge resistors arranged on a diaphragm; and a support member fixing the sensor section. A first pair to fourth pair of piezoresistive elements are arranged on the diaphragm. Two piezoresistive elements of each pair have opposite resistance value change directions, and distances to the support member are equal to each other. A distances between each piezoresistive element of the third pair and the fourth pair and the support member is longer than a distance between each piezoresistive element of the first pair and the second pair and the support member. Each gauge resistor includes a combined resistance, which is provided by serially connecting two corresponding piezoresistive elements. The two corresponding piezoresistive elements have a same resistance value change direction.

17 Claims, 26 Drawing Sheets

(56) References Cited

U.S. PATENT DOCUMENTS

| | | | |
|---|---|---|---|
| 5,184,520 A | 2/1993 | Naito | |
| 5,589,634 A | 12/1996 | Nagahara et al. | |
| 6,234,027 B1 | 5/2001 | Schatz | |
| 6,422,088 B1* | 7/2002 | Oba | G01D 3/08 73/754 |
| 2004/0177699 A1* | 9/2004 | Katsumata | G01L 9/0054 73/754 |
| 2004/0255682 A1* | 12/2004 | Petrova | G01L 9/0055 73/715 |
| 2005/0194685 A1 | 9/2005 | Weiblen et al. | |
| 2007/0151348 A1* | 7/2007 | Zdeblick | G01L 9/045 73/708 |
| 2008/0163695 A1* | 7/2008 | Ichikawa | G01L 9/0055 73/721 |
| 2011/0247421 A1* | 10/2011 | Tokuda | G01L 9/0054 73/716 |
| 2011/0247422 A1* | 10/2011 | Tokuda | G01L 9/0054 73/716 |
| 2012/0001278 A1* | 1/2012 | Ooya | G01L 9/0054 257/419 |
| 2013/0215931 A1* | 8/2013 | Vaiana | G01L 9/0054 374/178 |

FOREIGN PATENT DOCUMENTS

| | | |
|---|---|---|
| JP | S61-240134 A | 10/1986 |
| JP | S62-51249 U | 3/1987 |
| JP | H2-039574 A | 2/1990 |
| JP | H5-036993 A | 2/1993 |
| JP | H5-082805 A | 4/1993 |
| JP | H9-033371 A | 2/1997 |
| JP | H10-321874 A | 12/1998 |
| JP | 2002-350260 A | 12/2002 |

OTHER PUBLICATIONS

Written Opinion of the International Searching Authority mailed Sep. 11, 2012 for the corresponding international application No. PCT/JP2012/004697 (with English translation).

Office Action mailed Mar. 12, 2013 in corresponding JP application No. 2011-014284 (and English translation).

* cited by examiner (a)          (b)

(c)

(b)

(d)

(a)

(b)

(a)

(b)

US 9,513,182 B2

PRESSURE SENSOR HAVING MULTIPLE PIEZORESISTIVE ELEMENTS

CROSS REFERENCE TO RELATED APPLICATIONS

The present disclosure is a U.S. national stage application of PCT/JP2012/004697 filed on Jul. 24, 2012, and is based on Japanese Patent Applications No. 2011-14284 filed on Jan. 26, 2011, and No. 2012-147834 filed on Jun. 29, 2012, the contents of which are incorporated herein by reference.

TECHNICAL FIELD

The present disclosure relates to a pressure sensor that includes a sensor section, in which piezoresistive elements are formed, cantilever-supported by a support member.

BACKGROUND ART

In the related art, Patent Literature 1 discloses a pressure sensor including a sensor section that is provided with a diaphragm and a first gauge resistor to a fourth gauge resistor that are formed on the diaphragm to form a bridge circuit, and outputs a sensor signal based on pressure, and a support member that cantilever-supports the sensor section.

As shown in FIG. 6, in the pressure sensor, a sensor section J10 is formed in a rectangular parallelepiped shape, and has a fixed end J21 on one end thereof in a longitudinal direction thereof, in which the fixed end J21 is bonded to a support member J40 to be cantilever-supported. Further, the sensor section J10 is formed using a silicon substrate J20 having a main surface that is a (001) plane, and a diaphragm J24 is formed in the silicon substrate J20. The longitudinal direction of the sensor section J10 is parallel to a [110] direction.

The diaphragm J24 is formed in a square shape of which the outer contour line has a first side J24a to a fourth side J24d, in which the first side J24a and the third side J24c that face each other are parallel to a [−110] direction, and the second side J24b and the fourth side J24d that face each other are parallel to the [110] direction. Here, the first side J24a is disposed on the side of the fixed end J21. In the diaphragm J24, since central portions of the first side to the fourth side J24a to J24d are easily distorted when pressure is applied, a first gauge resistor to a fourth gauge resistor J25a to J25d of which resistance values are changed when the distortion is applied are respectively formed in portions adjacent to the central portions of the first side to the fourth side J24a to J24d.

In the pressure sensor, since the sensor section J10 is cantilever-supported by the support member J40, compared with a case where the entirety of a rear surface of the sensor section J10 is bonded to the support member J40, thermal stress generated in the diaphragm J24 when an external temperature is changed can be reduced. That is, the thermal stresses applied to the first gauge resistor to the fourth gauge resistor J25a to J25 can be reduced.

However, in the pressure sensor, when the external temperature is changed, the thermal stresses applied to the first gauge resistor to the fourth gauge resistor J25a to J25d can be reduced, but cannot be removed completely. In this case, a large thermal stress is generated in a portion close to the fixed end J21 in the diaphragm J24, and a thermal stress smaller than that generated on the side of the fixed end J21 is generated in a portion distant from the fixed end J21 in the diaphragm J24.

That is, the large thermal stress is applied to the first gauge resistor J25a, and a small thermal stress is applied to the third gauge resistor J25c. Thus, different thermal stresses are applied to the first gauge resistor to the fourth gauge resistor J25a to J25d when the external temperature is changed, and thus, a sensor signal becomes non-linear with respect to temperature (see FIG. 10). In this case, temperature characteristic correction of the sensor signal can be performed by an external circuit or the like, but if the sensor signal is non-linear with respect to temperature, the temperature characteristic correction becomes complicated.

In the above description, an example in which the pressure sensor that includes the sensor section J10 including the silicon substrate J20 in which the (001) plane is the main surface is described, but for example, even though the pressure sensor is configured to include the sensor section J10 including the silicon substrate J20 in which a (011) plane is the main surface, the above-mentioned problem similarly arises.

Further, since the sensor section J10 is cantilever-supported by the support member J40 in the pressure sensor, compared with a case where the entirety of the rear surface of the sensor section J10 is bonded to the support member J40, the thermal stress generated in the diaphragm J24 when the external temperature is changed can be reduced, and reduction of pressure detection accuracy can be suppressed.

However, in the pressure sensor, when the external temperature is changed, the thermal stress generated in the diaphragm J24 can be reduced, but cannot be removed completely. In this case, a large thermal stress is generated in a portion close to the fixed end J21 in the diaphragm J24, and a thermal stress smaller than that generated on the side of the fixed end J21 is generated in a portion distant from the fixed end J21 in the diaphragm J24. Specifically, the largest thermal stress is generated in a central portion of the first side J24a positioned on the side of the fixed end J21 in the diaphragm J24. Further, in the pressure sensor, the first piezoresistive element J25a is formed adjacent to the central portion of the first side J24a.

Thus, when the external temperature is changed, different thermal stresses are applied to the first piezoresistive element to the fourth piezoresistive element J25a to J25d, and thus, a difference between the thermal stresses applied to the first piezoresistive element to the fourth piezoresistive element J25a to J25d is output as noise (offset), and the pressure detection accuracy is reduced. Particularly, since the large thermal stress is applied to the first piezoresistive element J25a formed adjacent to the central portion of the first side J24a, a difference between a resistance value change of the first piezoresistive element J25a and resistance value changes of the other second to fourth piezoresistive elements J25b to J25d becomes large.

PRIOR ART LITERATURES

Patent Literature

Patent Literature 1: JP-A-2002-350260

SUMMARY OF INVENTION

It is an object of the present disclosure to provide a pressure sensor, in which a sensor section is cantilever-supported, capable of suppressing a non-linear sensor signal.

According to a first aspect of the present disclosure, a pressure sensor includes: a sensor section having one direction as a longitudinal direction, one end in the longitudinal direction as a fixed end, and the other end as a free end opposite to the one end, and including a thin diaphragm and a plurality of piezoresistive elements that is disposed on the diaphragm to provide a bridge circuit; and a support member that fixes the one end of the sensor section. The diaphragm has a shape having a first side of an outer contour line that orthogonally intersects the longitudinal direction. The first side is disposed on an one end side. The plurality of piezoresistive elements are disposed in a predetermined region other than a region around a middle point of the first side of the diaphragm.

In the pressure sensor with such a configuration, since the diaphragm has an outer appearance having one side on one end side, when an external temperature is changed, the largest thermal stress is generated in a region (central portion) around a middle point of the one side, but the piezoresistive elements are formed in a region excluding the region around the middle point of one side. Thus, compared with the pressure sensor in the related art in which the piezoresistive elements are formed in the portion where the largest thermal stress is generated when the external temperature is changed, the difference of the thermal stresses applied to the respective piezoresistive elements can be reduced, and the reduction of pressure detection accuracy can be suppressed.

Further, in the pressure sensor with such a configuration, the detection signal output from the bridge circuit is amplified by a predetermined multiple using an amplifier circuit, and the pressure is measured based on the amplified signal. Thus, an error of the amplified signal becomes larger as an absolute value of the maximum value of the thermal stresses applied to the respective piezoresistive elements becomes larger. However, in the pressure sensor, since the piezoresistive elements are formed in the region excluding the region around the middle point of the one side, when the external temperature is changed, the absolute value of the maximum value of the thermal stresses applied to the piezoresistive elements can be reduced. Thus, the reduction of pressure detection accuracy can further be suppressed.

According to a second aspect of the present disclosure, a pressure sensor includes: a sensor section having one direction as a longitudinal direction, one end in the longitudinal direction as a fixed end, and the other end as a free end opposite to the one end, and including a thin diaphragm and a plurality of piezoresistive elements that is disposed on the diaphragm to form a bridge circuit; and a support member that fixes the one end of the sensor section. The diaphragm has a circular outer contour line. A straight line, which is parallel to the longitudinal direction and passes through a center of the diaphragm, intersects an outer contour line of the diaphragm at two intersections. The plurality of piezoresistive elements is disposed in a predetermined region excluding a region around an intersection positioned on a fixed end side.

In the pressure sensor with such a configuration, the difference between the thermal stresses applied to the respective piezoresistive elements can be reduced, and the reduction of pressure detection accuracy can be suppressed.

Further, in the pressure sensor with such a configuration, when the external temperature is changed, the absolute value of the maximum value of the thermal stresses applied to the piezoresistive elements can be reduced. Thus, the reduction of pressure detection accuracy can further be suppressed.

According to a third aspect of the present disclosure, a pressure sensor includes: a sensor section having one direction as a longitudinal direction, one end in the longitudinal direction as a fixed end, and the other end as a free end opposite to the one end, and including a thin diaphragm and a plurality of piezoresistive elements that is disposed on the diaphragm to form a bridge circuit; and a support member that fixes the one end of the sensor section. The diaphragm has an outer contour line of a triangular shape. The triangular shape has a vertical angle with a first side to a third side. The vertical angle is disposed on a one end side. The plurality of piezoresistive elements is disposed in a predetermined region excluding a region around the vertical angle.

In the pressure sensor with such a configuration, the difference between the thermal stresses applied to the respective piezoresistive elements can be reduced, and the reduction of pressure detection accuracy can be suppressed.

Further, in the pressure sensor with such a configuration, when the external temperature is changed, the absolute value of the maximum value of the thermal stresses applied to the piezoresistive elements can be reduced. Thus, the reduction of pressure detection accuracy can further be suppressed.

According to a forth aspect of the present disclosure, a pressure sensor includes: a sensor section having one direction as a longitudinal direction, one end in the longitudinal direction as a fixed end, and the other end as a free end opposite to the one end, and including a thin diaphragm and a first gauge resistor to a fourth gauge resistor that are disposed on the diaphragm to form a bridge circuit; and a support member that fixes the one end of the sensor section. A first pair to a fourth pair of piezoresistive elements are disposed on the diaphragm. Each of the piezoresistive elements has a resistance value change direction indicating a direction, in which a resistance value increases or decreases according to an applied force. Two piezoresistive elements of each pair have opposite resistance value change directions. The first pair includes a first piezoresistive element and a fifth piezoresistive element, the second pair includes a second piezoresistive element and a sixth piezoresistive element, the third pair includes a third piezoresistive element and a seventh piezoresistive element, and the fourth pair includes a fourth piezoresistive element and an eighth piezoresistive element. Distances between piezoresistive elements of the first pair and the second pair and the support member are equal to each other. Distances between piezoresistive elements of the third pair and the fourth pair and the support member are longer than the distances between piezoresistive elements of the first pair and the second pair and the support member, and are equal to each other. The first gauge resistor includes a combined resistance, which is provided by serially connecting the first piezoresistive element and the eighth piezoresistive element, and the first piezoresistive element and the eighth piezoresistive element have a same resistance value change direction. The second gauge resistor includes a combined resistance, which is provided by serially connecting the second piezoresistive element and the seventh piezoresistive element, and the second piezoresistive element and the seventh piezoresistive element have a same resistance value change direction. The third gauge resistor includes a combined resistance, which is provided by serially connecting the third piezoresistive element and the sixth piezoresistive element, and the third piezoresistive element and the sixth piezoresistive element have a same resistance value change direction. The fourth gauge resistor includes a combined resistance, which is provided by serially connecting the fourth piezoresistive element and the fifth piezoresistive element, and the fourth piezoresistive element and the fifth piezoresistive element have a same resistance value change direction.

In the pressure sensor, each of the first gauge resistor to the fourth gauge resistor is formed by a combined resistance in which a piezoresistive element to which a large thermal stress is applied and a piezoresistive element to which a small thermal stress is applied are serially connected to each other. Thus, when the thermal stress is generated in the diaphragm, the difference between the sizes of the thermal stresses applied to the first gauge resistor to the fourth gauge resistor can be reduced. Accordingly, the difference between the sizes of resistance value changes due to the thermal stresses of the first gauge resistor to the fourth gauge resistor can be reduced, and the occurrence of a non-linear sensor signal can be suppressed.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
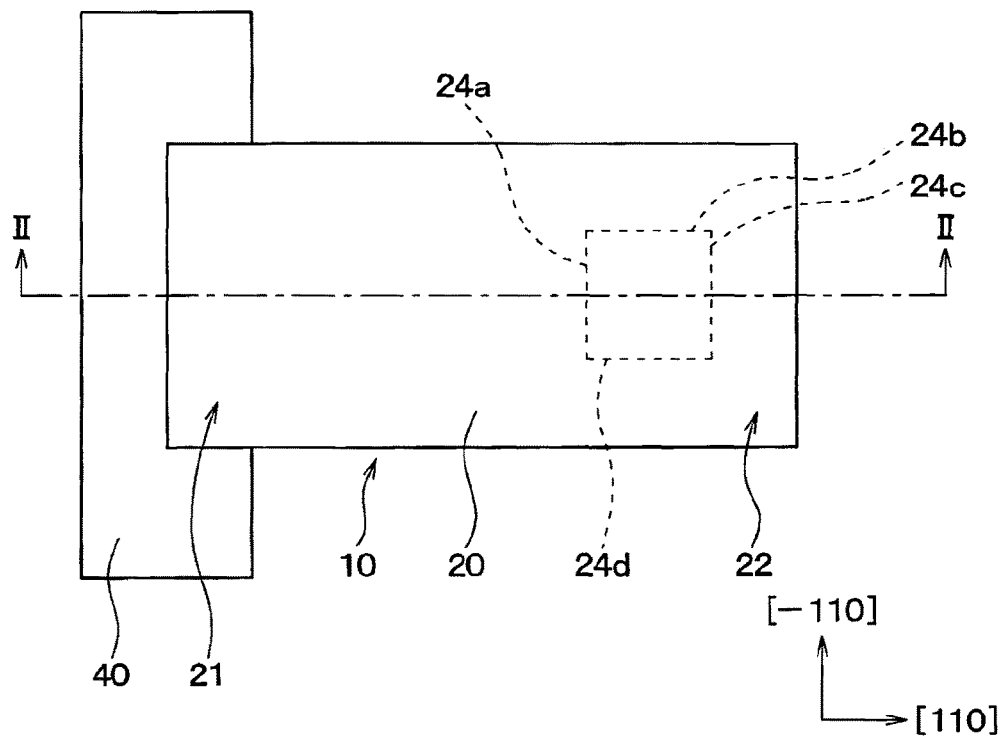
FIG. 1 is a plan view of a pressure sensor according to a first embodiment of the present disclosure.
Figure 2:
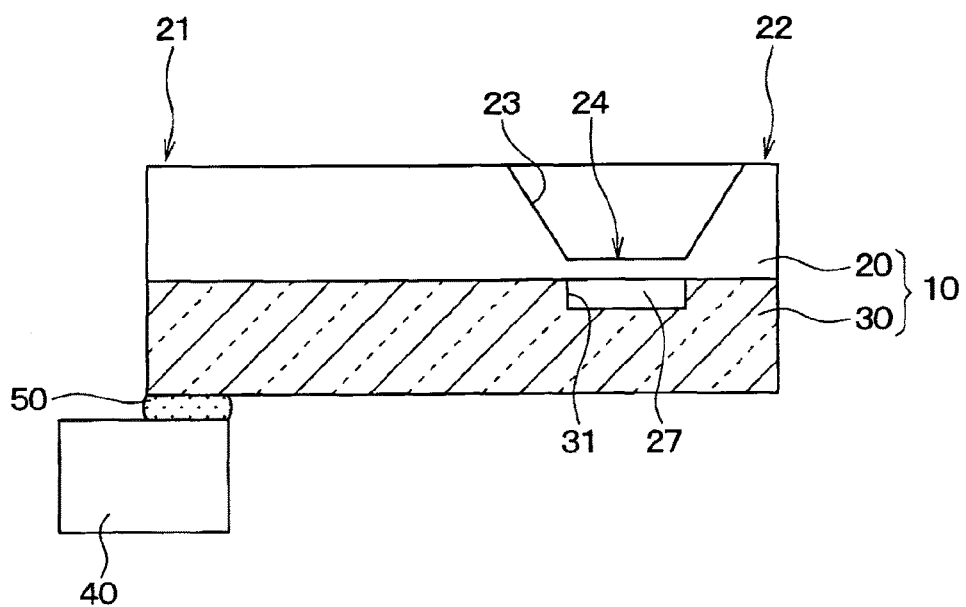
FIG. 2 is a cross-sectional view taken along line II-II in FIG. 1.

A first embodiment of the present disclosure will be described. As shown in FIGS. 1 and 2, a pressure sensor includes a sensor section 10, and a support member 40 that is formed of a resin material or the like and cantilever-supports the sensor section 10.

The sensor section 10 includes a silicon substrate 20 and a base 30 such as a glass substrate, and has a rectangular parallelepiped shape in which one direction thereof is a longitudinal direction. One end in the longitudinal direction is a fixed end 21, and the other end opposite to the one end is a free end 22. Further, the fixed end 21 is bonded to the support member 40 through a bonding member 50 such as an adhesive. That is, the sensor section 10 is cantilever-supported by the support member 40. The longitudinal direction of the sensor section 10 refers to a direction along the direction.

The silicon substrate 20 is formed in the rectangular parallelepiped shape. In the present embodiment, a main surface thereof corresponds to the (001) plane, and the [110] axis and the [−110] axis are orthogonal to each other on the main surface. Further, in the silicon substrate 20, a recess 23 which has a trapezoid-like cross section formed by performing anisotropic etching or the like on the front surface is formed on the side of the free end 22 with reference to the side of the fixed end 21, so that a diaphragm 24 is formed by a thin portion according to the recess 23.

The reason why the diaphragm 24 is formed on the side of the free end 22 is because thermal stress generated in the diaphragm 24 decreases when an external temperature is changed, compared with a case where the diaphragm 24 is formed on the side of the fixed end 21.

In the present embodiment, the diaphragm 24 has a configuration in which a first side to a fourth side 24a to 24b of an outer contour line (line indicated by a dashed line in FIG. 1A) are parallel to the <110> direction, and a planar shape thereof is a square shape. Specifically, the first side 24a and the third side 24c that face each other among the first side to the fourth side 24a to 24d are parallel to the [−110] direction, and the second side 24b and the fourth side 24d that face each other are parallel to the [110] direction. Further, the diaphragm 24 is formed so that the first side 24a is located on the side of the fixed end 21.

Further, the diaphragm 24 is formed so that an axis that passes through the center of the silicon substrate 20 and extends in the [110] direction passes through the center of the diaphragm 24. In other words, the diaphragm 24 is symmetrically formed with reference to the [110] axis that passes through the center of the silicon substrate 20.

In the present embodiment, the [110] direction corresponds to a first direction of the present disclosure, and the [−110] direction corresponds to a second direction of the present disclosure.

Figure 3:
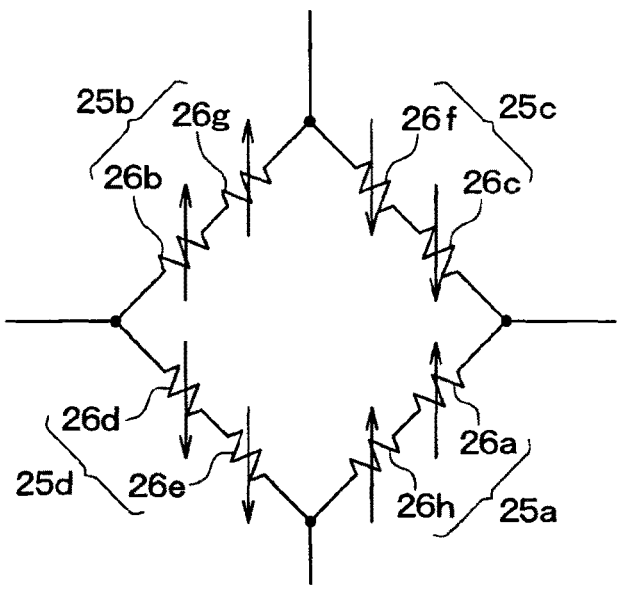
FIG. 3 is a circuit diagram of a bridge circuit formed by a first gauge resistor to a fourth gauge resistor.

Further, a first gauge resistor to a fourth gauge resistor 25a to 25d of which a resistance value varies by stress are provided to form a Wheatstone bridge circuit (hereinafter, simply referred to as a bridge circuit) on the diaphragm 24, as shown in FIG. 3. Hereinafter, the first gauge resistor to the fourth gauge resistor 25a to 25d will be described in detail.

Figure 4:
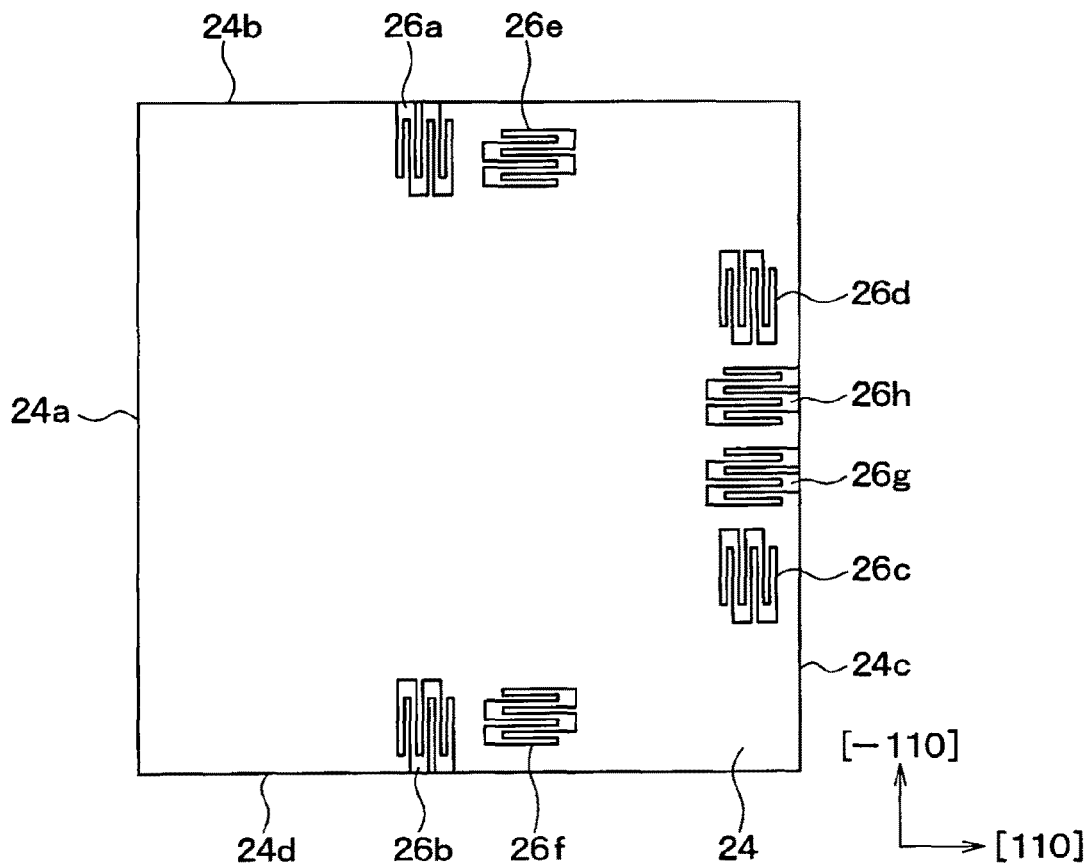
FIG. 4 is an enlarged view of a diaphragm shown in FIG. 1.

The first gauge resistor to the fourth gauge resistor 25a to 25d are formed using first to eighth piezoresistive elements 26a to 26h. As shown in FIG. 4, the first piezoresistive element to the eighth piezoresistive element 26a to 26h are formed on the diaphragm 24 as respective sets of two piezoresistive elements in which an increase and a decrease of resistance values are opposite according to an applied force.

In the present embodiment, the first piezoresistive element 26a and the fifth piezoresistive element 26e are used as a first pair, the second piezoresistive element 26b and the sixth piezoresistive element 26f are used as a second pair, the third piezoresistive element 26c and the seventh piezoresistive element 26g are used as a third pair, and the fourth piezoresistive element 26d and the eighth piezoresistive element 26h are used as a fourth pair. Further, the first pair of the first piezoresistive element 26a and the fifth piezoresistive element 26e is formed adjacent to a central portion of the second side 24b of the diaphragm 24, and the second pair of the second piezoresistive element 26b and the sixth piezoresistive element 26f is formed adjacent to a central portion of the fourth side 24d. Distances to the support member 40 from the two pairs of the piezoresistive elements 26a, 26e, 26b, and 26f are equal to each other. In addition, distances to the support member 40 from the third pair of the third piezoresistive element 26c and the seventh piezoresistive element 26g and the fourth pair of the fourth piezoresistive element 26d and the eighth piezoresistive element 26h that are formed adjacent to a central portion of the third side 24c of the diaphragm 24 are equal to each other.

In other words, the first piezoresistive element to the eighth piezoresistive element 26a to 26h of the present embodiment are formed in a region excluding a region around a middle point of the first side 24a in the diaphragm 24. That is, the first piezoresistive element to the eighth piezoresistive element 26a to 26h are formed in a region excluding the vicinity of the middle point of the first side 24a, and are formed so as not to be in contact with the middle point of the first side 24a. That is, the first piezoresistive element to the eighth piezoresistive element 26a to 26h are formed in a region excluding a portion where the largest thermal stress is generated in the diaphragm 24 when the external temperature is changed. In other words, all of the first piezoresistive element to the eighth piezoresistive element 26a to 26h are formed on the side of the free end 22 in the diaphragm 24.

The reason why the first piezoresistive element to the eighth piezoresistive element 26a to 26h are formed adjacent to the central portions of the second side 24b to the fourth side 24d is because when the main surface of the silicon substrate 20 is the (001) plane, the central portions of the second side 24b to the fourth side 24d are easily distorted when pressure is applied to the diaphragm 24.

The first piezoresistive element to the eighth piezoresistive element 26a to 26h are formed in a zigzag shape in which straight segments that extend in one direction are repeatedly bent at end parts thereof, and are the same size. Specifically, the first piezoresistive element to the fourth piezoresistive element 26a to 26d have the straight segments that extend in the [−110] direction, and the fifth piezoresistive element 26e to the eighth piezoresistive element 26h have the straight segments that extend in the [110] direction. Thus, in the first, second, seventh and eighth piezoresistive elements 26a, 26b, 26g, and 26h, the resistance values increase according to the force generated in the diaphragm 24, and in the third, fourth, fifth, and sixth piezoresistive elements 26c, 26d, 26e, and 26f, the resistance values decrease according to the force generated in the diaphragm 24.

Figure 5:
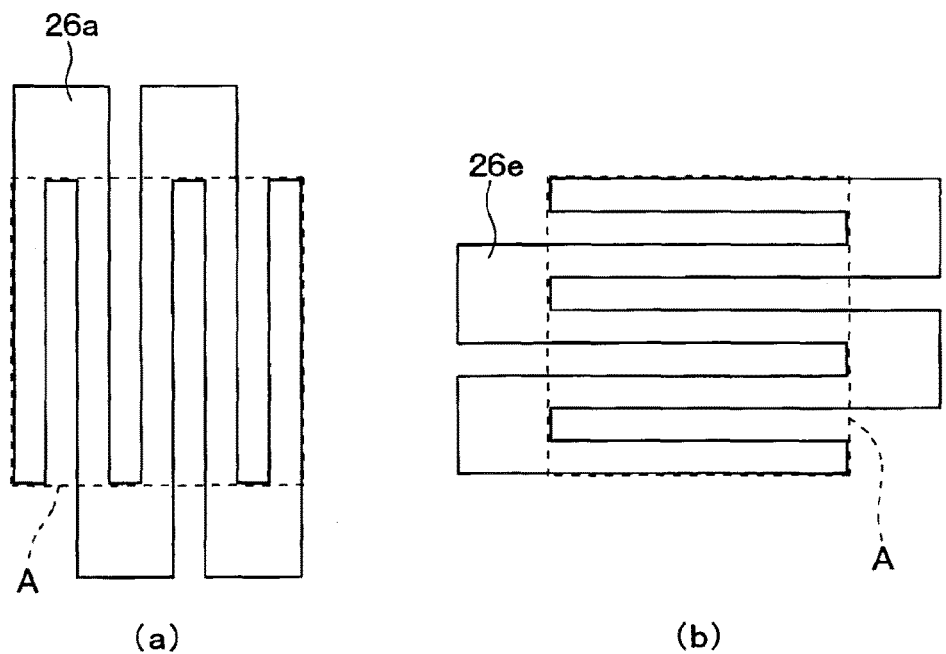
FIG. 5(a) is a diagram illustrating a first piezoresistive element.
FIG. 5(b) is a diagram illustrating a fifth piezoresistive element.

Further, the first piezoresistive element to the eighth piezoresistive element 26a to 26h are formed so that a region A that surrounds the straight segments, which determines the resistance values, is formed in a square shape. That is, as shown in FIG. 5, referring to the first piezoresistive element 26a and the fifth piezoresistive element 26e, the first piezoresistive element 26a and the fifth piezoresistive element 26e have shapes that become same as each other by being rotated by 90°, and have the same sensitivity.

Further, the first gauge resistor to the fourth gauge resistor 25a to 25b are formed by the first piezoresistive element to the eighth piezoresistive element 26a to 26h formed as described above. Specifically, as shown in FIG. 3, the first gauge resistor 25a is formed by serially connecting the first piezoresistive element 26a and the eighth piezoresistive element 26h, and the second gauge resistor 25b is formed by serially connecting the second piezoresistive element 26b and the seventh piezoresistive element 26g. Further, the third gauge resistor 25c is formed by serially connecting the third piezoresistive element 26c and the sixth piezoresistive element 26f, and the fourth gauge resistor 25d is formed by serially connecting the fourth piezoresistive element 26d and the fifth piezoresistive element 26e.

That is, the first gauge resistor to the fourth gauge resistor 25a to 25d are formed by a combined resistance in which one piezoresistive element in the first pair and the second pair and one piezoresistive element in the third pair and the fourth pair, in which a sign of the increase or decrease of the resistance value according to the applied force is the same as in the one piezoresistive element in the first pair and the second pair, are serially connected to each other.

Further, in the present embodiment, a constant current is supplied from a common connection point of the second gauge resistor 25b and the third gauge resistor 25c, and pressure is detected from a potential difference between a common connection point of the first gauge resistor 25a and the third gauge resistor 25c and a common connection point of the second gauge resistor 25b and the fourth gauge resistor 25d.

The first piezoresistive element to the eighth piezoresistive element 26a to 26h are electrically connected to each other through interconnections (not shown) such as a diffusion interconnection formed on the silicon substrate 20 or a metal interconnection formed on the silicon substrate 20, respectively. In this case, the interconnections may be formed inside the diaphragm 24, or may be formed outside the diaphragm 24.

Further, in FIG. 3, arrows directed upward on the plane of the figure shown over the first gauge resistor 25a and the second gauge resistor 25b represent that the resistance values increase when force is applied to the diaphragm 24, and arrows directed downward on the plane of the figure shown over the third gauge resistor 25c and the fourth gauge resistor 25d represent that the resistance values decrease when force is applied to the diaphragm 24.

Further, as shown in FIG. 2, the rectangular parallelepiped base 30 formed of a glass substrate, a silicon substrate or the like is bonded to a rear surface of the silicon substrate 20, A recess 31 is formed in a region of the base 30 that faces the bottom surface of the recess 23. Thus, a pressure reference chamber 27 is formed by the recess 31 and the silicon substrate 20. In the present embodiment, the pressure reference chamber 27 has a vacuum pressure, but for example, may have an atmospheric pressure.

In the present embodiment, the pressure sensor has the above-described configuration. Next, a sensor signal when the thermal stress is applied to the sensor section 10 will be described compared with a pressure sensor in the related art.

Figure 6:
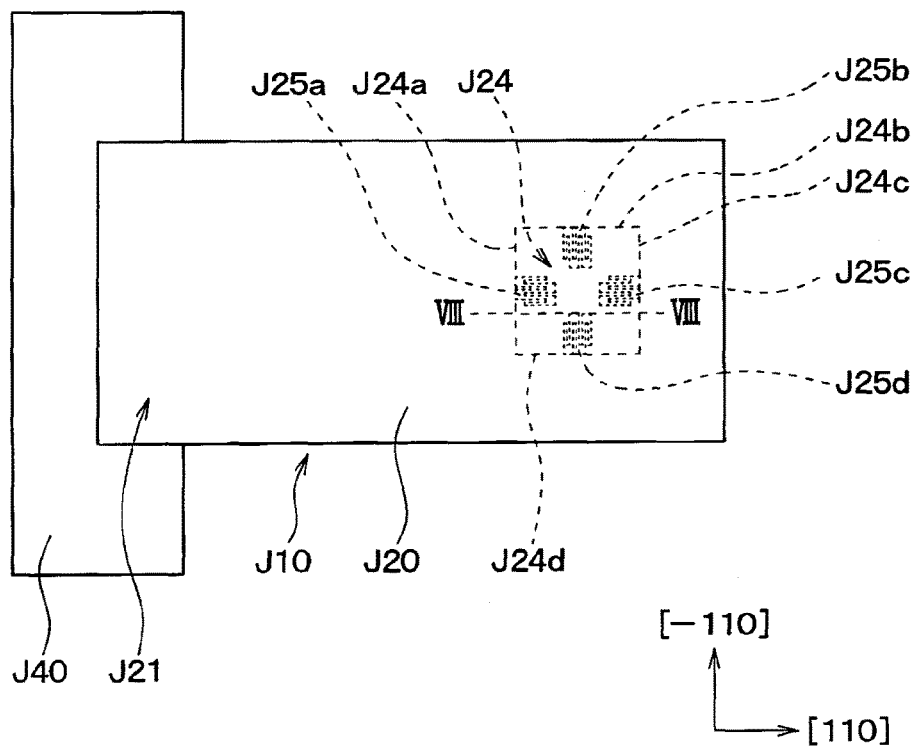
FIG. 6 is a plan view of a pressure sensor in the related art.
Figure 7:
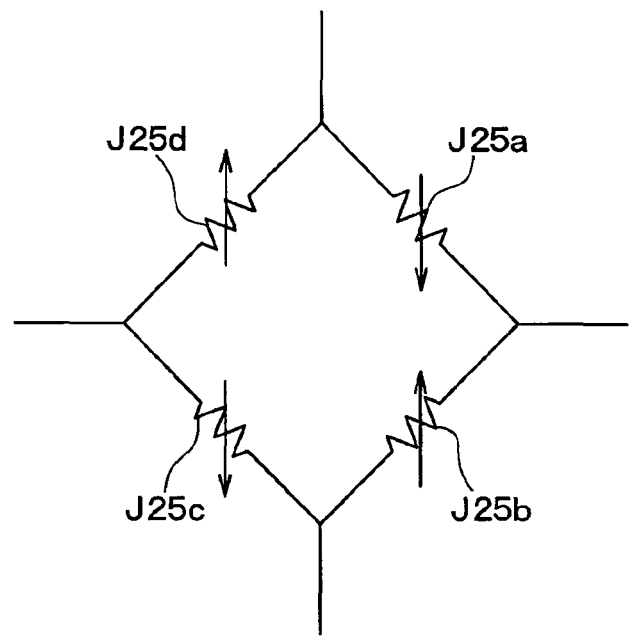
FIG. 7 is a circuit diagram of a bridge circuit formed by a first gauge resistor to a fourth gauge resistor shown in FIG. 6.

First, the pressure sensor in the related art will be described. In the pressure sensor in the related art, as shown in FIGS. 6 and 7, a diaphragm J24 is formed in the same shape as that of the diaphragm 24 of the present embodiment, and a first gauge resistor to a fourth gauge resistor J25a to J25d are formed adjacent to central portions of a first side J24a to a fourth side J24d to form a bridge circuit.

Figure 8:
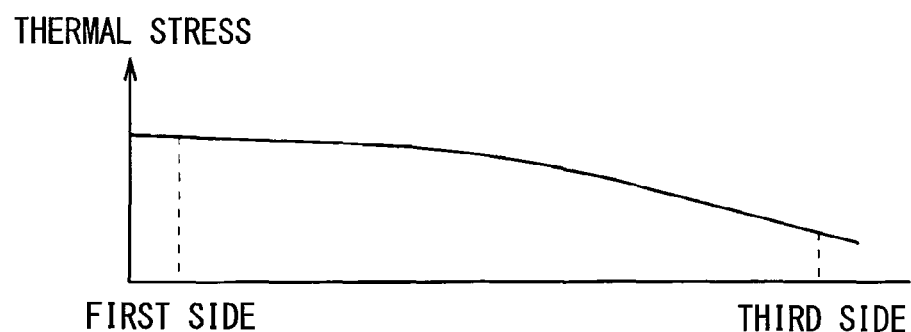
FIG. 8 is a diagram illustrating stress distribution taken along line VIII-VIII in FIG. 6.
Figure 9:
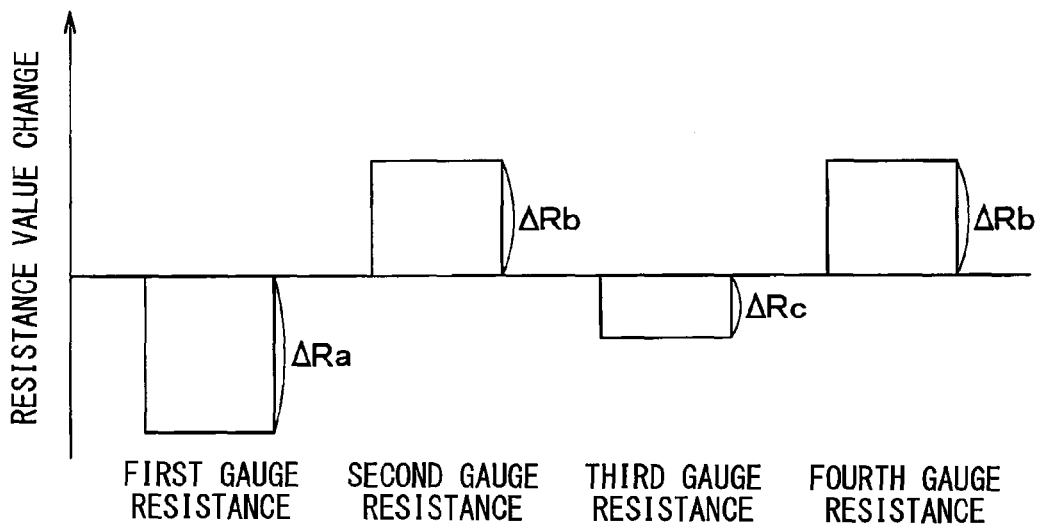
FIG. 9 is a diagram illustrating resistance value changes of the first gauge resistor to the fourth gauge resistor shown in FIG. 6.

Further, when a thermal stress is generated in the diaphragm J24, as shown in FIG. 8, the thermal stress is a maximum on the side of the first side J24a (side of the fixed end 21), and gradually decreases toward the side of the third side J24c (side of the free end 22). Thus, resistance value changes of the first gauge resistor to the fourth gauge resistor J25a to J25d are made, as shown in FIG. 9, such that the size ($\Delta$Ra) of the resistance value change of the first gauge resistor J25a becomes larger than the sizes ($\Delta$Rb) of the resistance value changes of the second gauge resistor J25b and the fourth gauge resistor J25d, and the sizes ($\Delta$Rb) of the resistance value changes of the second gauge resistor J25b and the fourth gauge resistor J25d become larger than the size ($\Delta$Rc) of the resistance value change of the third gauge resistor J25c. Further, the resistance value Ra of the first gauge resistor J25a is indicated as the following expression.

$$Ra = R - \Delta Ra \quad \text{(Expression 1)}$$

Here, R represents a reference resistance value, and the size of the resistance value change is represented by an absolute value. Further, the resistance value Rb of the second gauge resistor J25b and the resistance value Rd of the fourth gauge resistor J25d are indicated by the following expression.

$$Rb = Rd = R + \Delta Rb \quad \text{(Expression 2)}$$

Further, the resistance value Rc of the third gauge resistor J25c is indicated by the following expression.

$$Rc = R - \Delta Rc \quad \text{(Expression 3)}$$

Thus, the sensor signal output from the pressure sensor in the related art is indicated as follows.

$$\Delta V = \frac{(R+\Delta Rb)\cdot(R+\Delta Rb) - (R-\Delta Ra)\cdot(R-\Delta Rc)}{(R-\Delta Ra)+(R+\Delta Rb)+(R-\Delta Rc)+(R+\Delta Rb)} \cdot I \quad \text{(Expression 4)}$$

$$= \frac{2R\cdot\Delta Rb + \Delta Rb^2 + R\cdot\Delta Ra + R\cdot\Delta Rc - \Delta Ra\cdot\Delta Rc}{4R + 2\Delta Rb - \Delta Ra - \Delta Rc}$$

Figure 10:
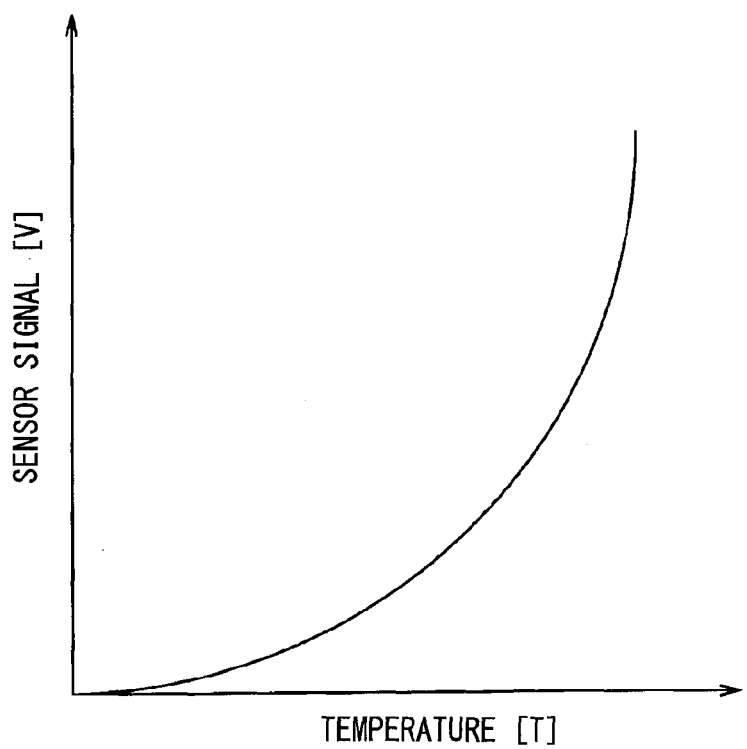
FIG. 10 is a diagram illustrating the relationship between a sensor signal of a pressure sensor and temperature in the related art.

Accordingly, in the pressure sensor in the related art, the sensor signal becomes non-linear with respect to the temperature, as shown in FIG. 10.

On the other hand, in the present embodiment, since the first pair of the first piezoresistive element 26a and the fifth piezoresistive element 26e is formed adjacent to the central portion of the second side 24b, and the second pair of the second piezoresistive element 26b and the sixth piezoresistive element 26f is formed adjacent to the central portion of the fourth side 24d, thermal stresses applied to the first pair of the first piezoresistive element 26a and the fifth piezoresistive element 26e, and the second pair of the second piezoresistive element 26b and the sixth piezoresistive element 26f are approximately the same. Further, since the third pair of the third piezoresistive element 26c and the seventh piezoresistive element 26g, and the fourth pair of the fourth piezoresistive element 26d and the eighth piezoresistive element 26f are formed adjacent to the central portion of the third side 24c, thermal stresses applied to the third, seventh, fourth and eighth piezoresistive elements 26c, 26g, 26d, and 26f are approximately the same.

Figure 11:
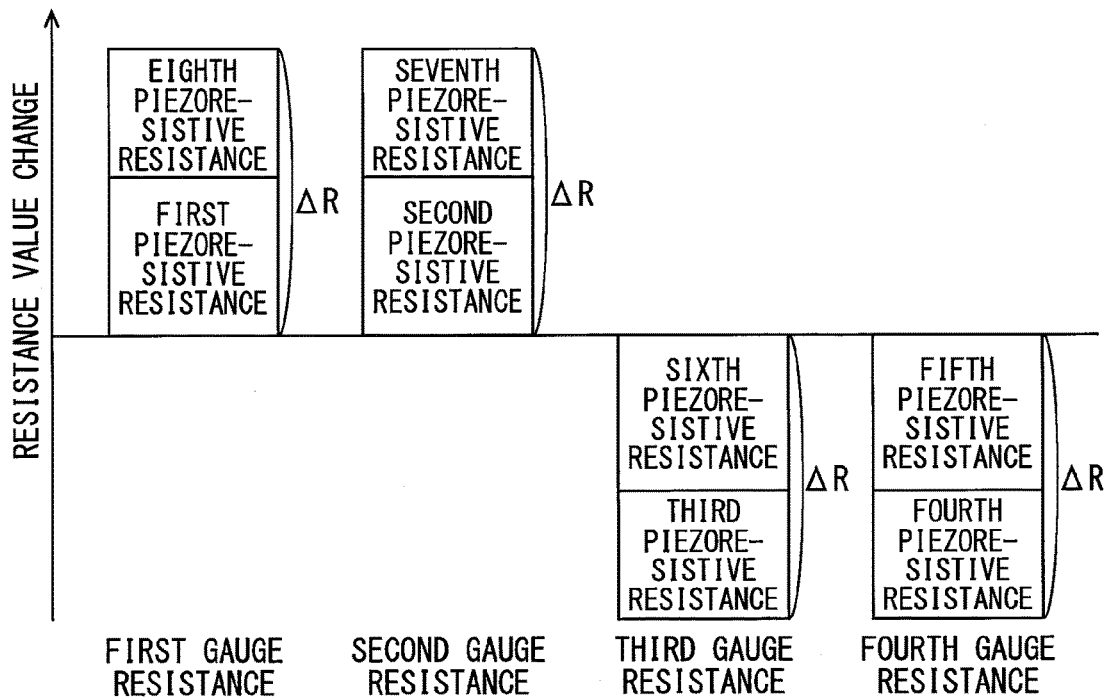
FIG. 11 is a diagram illustrating resistance value changes of the first gauge resistor to the fourth gauge resistor shown in FIG. 3.

Further, the first gauge resistor to the fourth gauge resistor 25a to 25d are formed by combined resistances in which the first piezoresistive element to the eighth piezoresistive element 26a to 26h are appropriately serially connected to each other as described above. That is, the first gauge resistor to the fourth gauge resistor 25a to 25d are formed so that the first, second, fifth and sixth piezoresistive elements 26a, 26b, 26e, and 26f in which the size of the resistance value change is large, and the third, fourth, seventh, and eighth piezoresistive elements 26c, 26d, 26g, 26h in which the size of the resistance value change is small are serially connected. Thus, if the thermal stress is generated in the diaphragm 24, in the first gauge resistor to the fourth gauge resistor 25a to 25b, as shown in FIG. 11, the sizes of the resistance value changes have approximately the same value $\Delta R$. Accordingly, the sensor signal is indicated by the following expression.

$$\Delta V = \Delta R \cdot I \quad \text{(Expression 5)}$$

Figure 12:
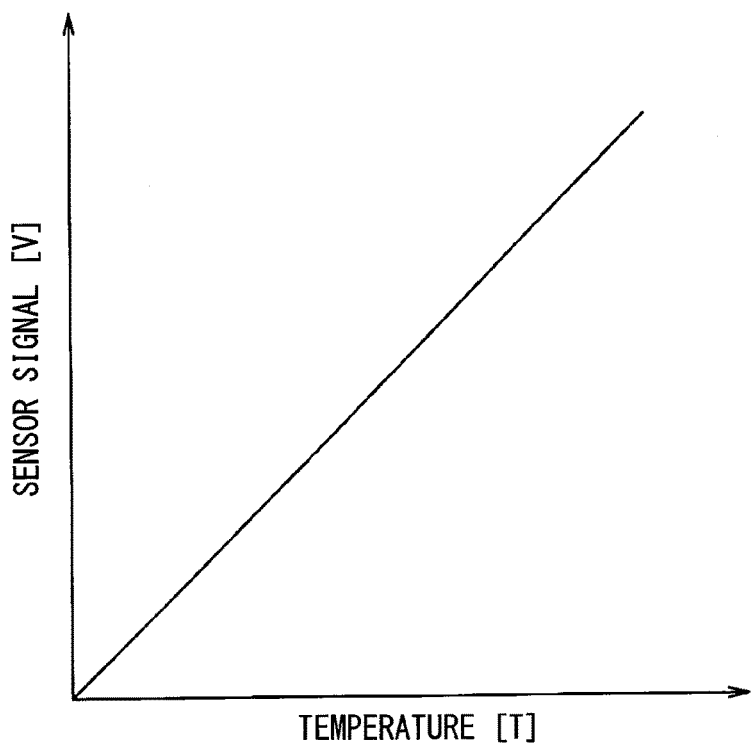
FIG. 12 is a diagram illustrating the relationship between a sensor signal of a pressure sensor shown in FIG. 1 and temperature.

Thus, in the pressure sensor of the present embodiment, as shown in FIG. 12, the occurrence of the non-linear sensor signal with respect to the temperature can be suppressed. Herein, an example in which the constant current is supplied to the bridge circuit is described, but the same effect is also obtained when a constant voltage is supplied to the bridge circuit.

As described above, in the pressure sensor of the present embodiment, the first gauge resistor to the fourth gauge resistor 25a to 25d are formed by the combined resistance in which the first piezoresistive element to the eighth piezoresistive element 26a to 26h are appropriately serially connected to each other. Thus, when the thermal stress is generated in the diaphragm 24, the difference between the sizes of the thermal stresses applied to the first gauge resistor to the fourth gauge resistor 25a to 25d can be reduced. Accordingly, the difference between the resistance value changes due to the thermal stresses of the first gauge resistor to the fourth gauge resistor 25a to 25d can be reduced, and the occurrence of the non-linear sensor signal can be suppressed. Further, since the occurrence of the non-linear sensor signal can be suppressed, when a temperature characteristic correction is performed using an external circuit, the temperature characteristic correction can be performed by only providing a temperature compensation resistance or the like, and the complexity of calculation in performing the temperature characteristic correction can be suppressed.

Further, the diaphragm 24 has the shape that is symmetric with reference to the [110] axis that passes through the center of the silicon substrate 20. Thus, when the thermal stress is generated in the diaphragm 24, the difference between the thermal stress applied to the first piezoresistive element 26a and the fifth piezoresistive element 26e and the thermal stress applied to the second piezoresistive element 26b and the sixth piezoresistive element 26f can be reduced.

Further, in the present embodiment, the first piezoresistive element 26a and the eighth piezoresistive element 26h are formed in the region around the middle point of the first side 24a in the diaphragm 24. Thus, the occurrence of the non-linear sensor signal can be suppressed.

That is, the occurrence of the non-linear sensor signal can be suppressed by forming the first gauge resistor to the fourth gauge resistor 25a to 25d as described above, but for example, since the first piezoresistive element 26a and the fifth piezoresistive element 26e are disposed in parallel to the [110] direction, the thermal stresses applied to the first piezoresistive element 26a and the fifth piezoresistive element 26e are slightly different from each other. Thus, by forming the first piezoresistive element to the eighth piezoresistive element 26a to 26h in the region excluding the region around the middle point of the first side 24a where the maximum stress is applied to the diaphragm 24, the sizes of the thermal stresses applied to the first piezoresistive element to the eighth piezoresistive element 26a to 26h can be reduced. That is, the difference between the sizes of the thermal stresses applied to the first piezoresistive element to the eighth piezoresistive element 26a to 26h can be reduced, and thus, the difference between the sizes of the thermal stresses applied to the first gauge resistor to the fourth gauge resistor 25a to 25d can be reduced. Thus, the occurrence of the non-linear sensor signal can further be suppressed.

Further, in the present embodiment, the diaphragm 24 is formed on the side of the free end 22 on the silicon substrate 20. Thus, the thermal stress applied from the support member 40 between the diaphragm 24 and the support member 40 on the silicon substrate 20 can be relaxed, and thus, the thermal stress generated in the diaphragm 24 can be reduced.

Second Embodiment

A second embodiment of the present disclosure will be described. A pressure sensor according to the present embodiment is configured so that the shape of the diaphragm 24 is changed compared with the first embodiment. Since the other configurations thereof are the same as in the first embodiment, the description will not be repeated.

Figure 13:
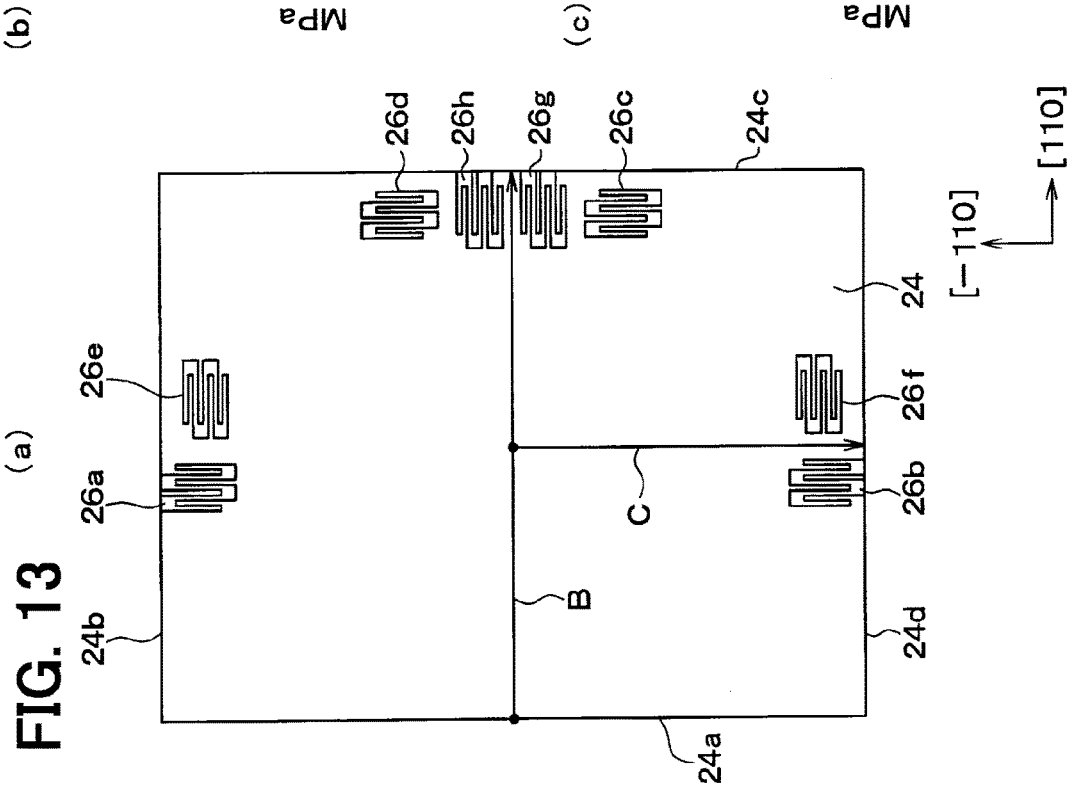
FIG. 13(a) is a plan view of a diaphragm in a second embodiment of the present disclosure.
FIG. 13(b) shows a simulation result of a thermal stress along a direction B in FIG. 13(a)
FIG. 13(c) shows a simulation result of a thermal stress in a direction C in FIG. 13(a)

As shown in FIGS. 13(a) to 13(c), when the ratio of (length in [−110] direction)/(length in [110] direction) is represented as an aspect ratio, the diaphragm 24 is formed in a rectangular shape of which the aspect ratio is larger than 1. In such a pressure sensor, when an external temperature is changed, the thermal stress generated in the diaphragm 24 can be reduced. That is, the thermal stresses applied to the first gauge resistor to the fourth gauge resistor 25a to 25d can be reduced.

Figure 14:
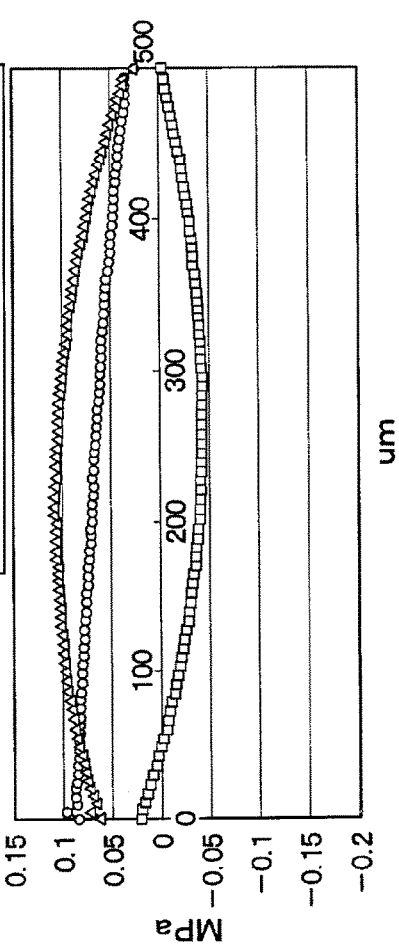
FIG. 14(a) is a plan view of a diaphragm of which an aspect ratio is 1.
FIG. 14(b) shows a simulation result of a thermal stress along a direction D in FIG. 14(a)
FIG. 14(c) shows a simulation result of a thermal stress in a direction E in FIG. 14(a)
Figure 14:
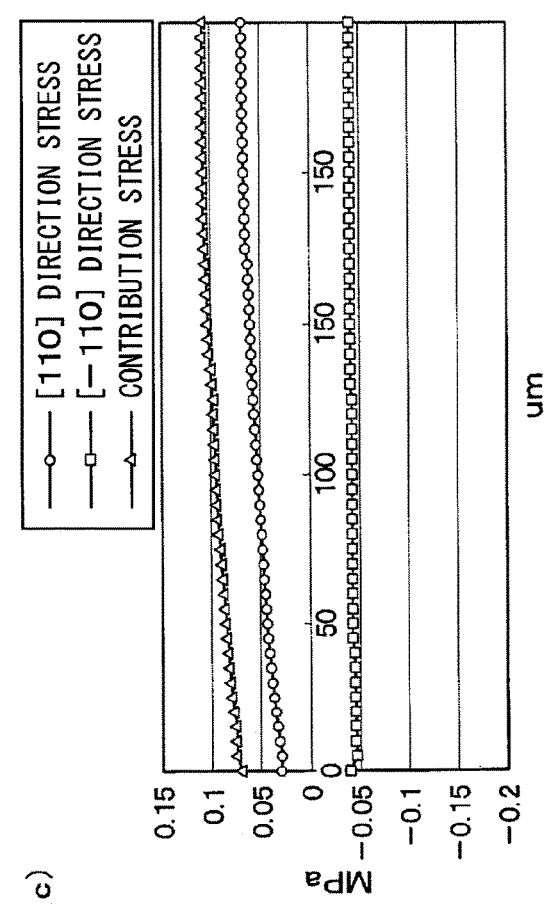
Figure 14:
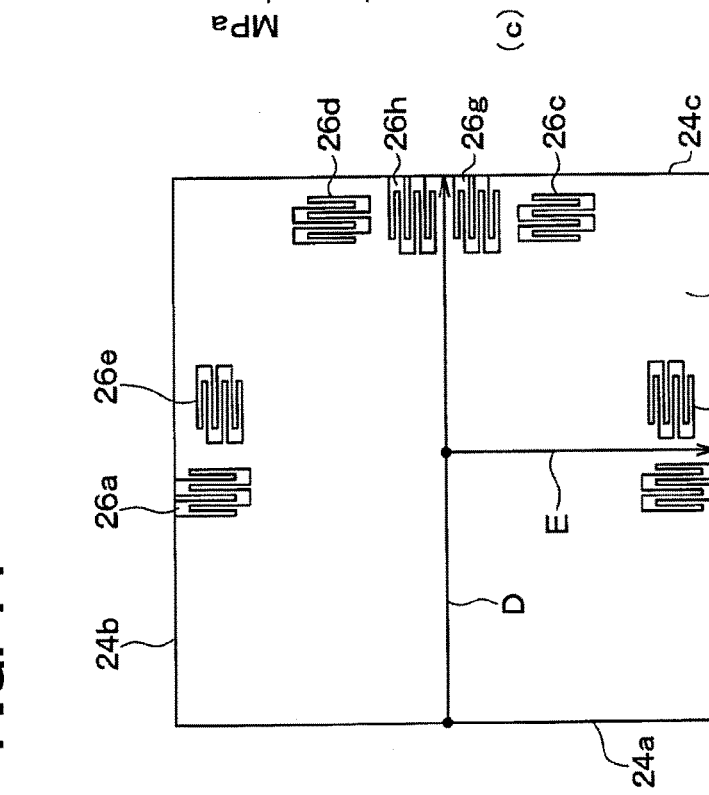
Figure 15:
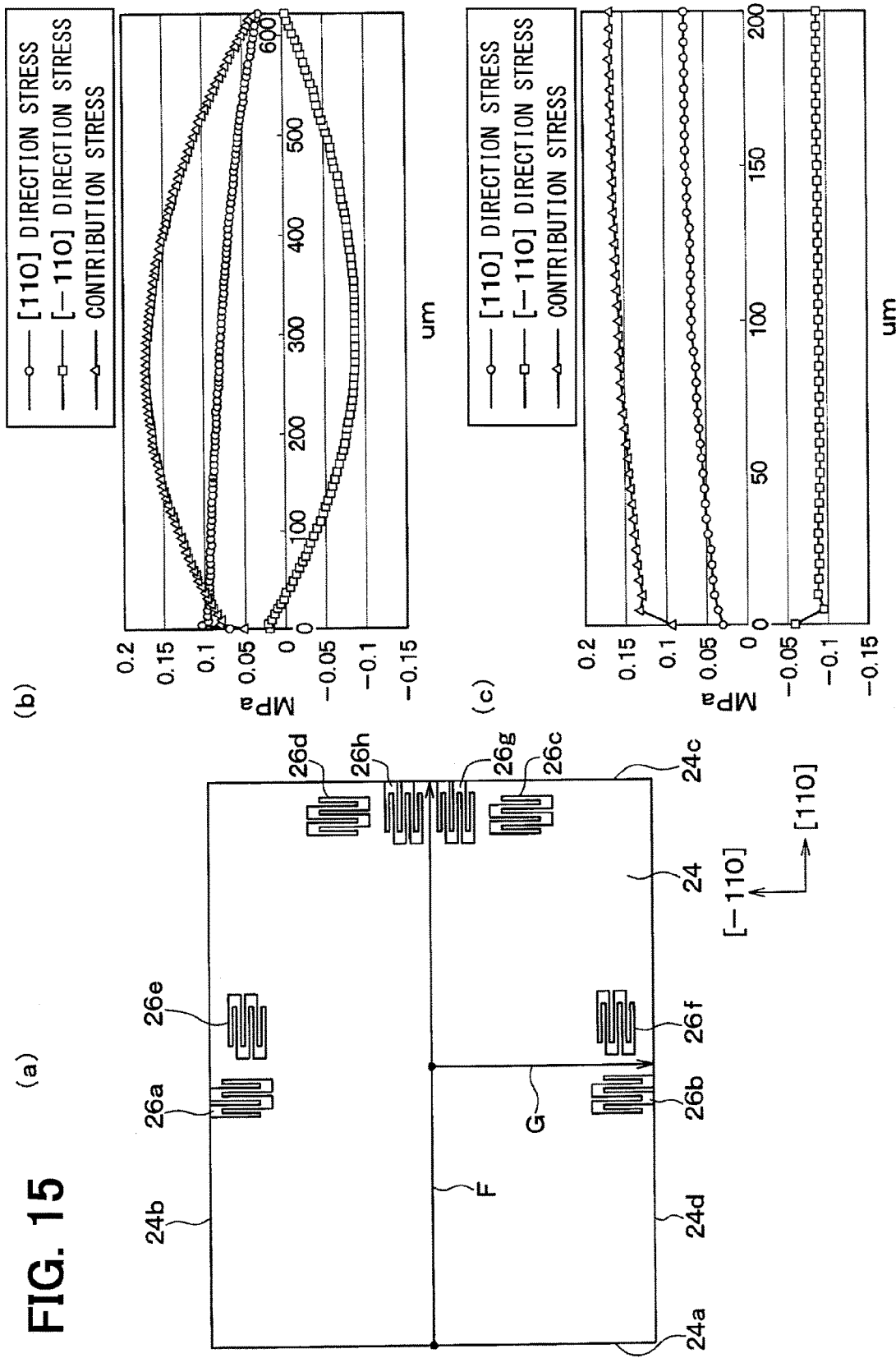
FIG. 15(a) is a plan view of a diaphragm of which an aspect ratio is smaller than 1.
FIG. 15(b) shows a simulation result of a thermal stress in a direction F in FIG. 15(a)
FIG. 15(c) shows a simulation result of a thermal stress in a direction G in FIG. 15(a)

That is, as shown in FIGS. 14(a) to 14(c), when the diaphragm 24 of which the aspect ratio is 1 is used as a reference, as shown in FIGS. 13(a) to 13(c), in the diaphragm 24 of which the aspect ratio is larger than 1, the thermal stress that contributes to the piezoelectric resistance effect decreases, but as shown in FIGS. 15(a) to 15(c), in the diaphragm 24 of which the aspect ratio is smaller than 1, the thermal stress that contributes to the piezoelectric resistance effect increases.

In FIGS. 13(b) and 13(c), FIGS. 14(b) and 14(c), and FIGS. 15(b) and 15(c), a circle represents a thermal stress in the [110] direction, a square represents a thermal stress in the [−110] direction, and a triangle represents a thermal stress that contributes to the piezoelectric resistance effect (simply shown as a contribution stress in the figure). Further, FIGS. 13(b) and 13(c), FIGS. 14(b) and 14(c), and FIGS. 15(b) and 15(c) show simulation results when the external temperature is 150° C.

The reason is considered as follows. That is, since the sensor section 10 is formed in the rectangular parallelepiped shape using the [110] direction as the longitudinal direction and the fixed end 21 is fixed to the support member 40, when the external temperature is changed, the sensor section 10 is easily bent with reference to the axis of the [−110] direction. That is, the free end 22 is easily displaced in the vertical direction. Further, the direction where the diaphragm 24 is easily bent is changed according to the aspect ratio. That is, when the aspect ratio is larger than 1, the diaphragm 24 is easily bent with reference to the axis of the [110] direction, and when the aspect ratio is smaller than 1, the diaphragm 24 is easily bent with reference to the axis of the [−110] direction.

That is, in the diaphragm 24 of which the aspect ratio is equal to or smaller than 1, when the external temperature is changed, the direction where the sensor section 10 is easily bent and the direction where the diaphragm 24 is easily bent are the same, and thus, the thermal stress generated in the diaphragm 24 increases. On the other hand, in the diaphragm 24 of which the aspect ratio is larger than 1, since the direction where the sensor section 10 is easily bent and the direction where the diaphragm 24 is easily bent intersect each other, the thermal stress generated in the diaphragm 24 decreases, compared with the pressure sensor of which the aspect ratio is equal to or smaller than 1.

Accordingly, in the present embodiment, the thermal stress generated in the diaphragm 24 can be reduced, and the occurrence of the non-linear sensor signal can be suppressed.

Third Embodiment

A third embodiment of the present disclosure will be described. A pressure sensor of the present embodiment is configured so that the surface orientation of the main surface of the silicon substrate 20 is changed compared with the first embodiment. Since the other configurations of the third embodiment are the same as those of the first embodiment, the description will not be repeated.

Figure 16:
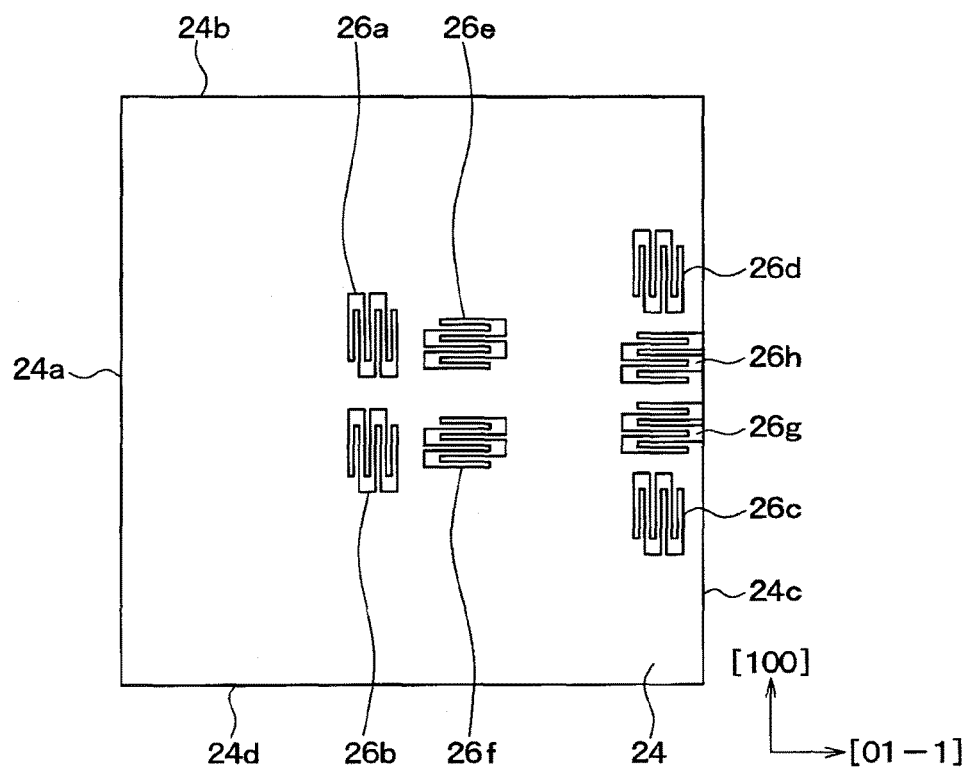
FIG. 16 is a plan view of a diaphragm according to a third embodiment of the present disclosure.

As shown in FIG. 16, the silicon substrate 20 of the present embodiment has a main surface of the (011) plane. On the main surface, the [01-1] axis and the [100] axis are present so as to be orthogonal to each other. In this way, when the silicon substrate 20 of which the main surface is the (011) plane is used, when pressure is applied to the diaphragm 24 from a measurement medium, a large difference occurs between a central region and a peripheral region along the [01-1] axis direction from the center.

Accordingly, in the present embodiment, the first pair of the first piezoresistive element 26a and the fifth piezoresistive element 26e, and the second pair of the second piezoresistive element 26b and the sixth piezoresistive element 26f are formed at the central portion of the diaphragm 24.

Even when the substrate of which the main surface is the (011) plane is used as the silicon substrate 20 as described above, similar to the above-described first embodiment, if the first gauge resistor to the fourth gauge resistor 25a to 25d are formed by the combined resistances in which the first piezoresistive element to the eighth piezoresistive element 26a to 26h are appropriately serially connected to each other, the same effect can be obtained.

Other Embodiments

In the above-described respective embodiments, an example in which the fixed end 21 of the sensor section 10 is bonded to the support member 40 through the bonding member 50 is described. However, for example, the fixed end 21 of the sensor section 10 may be sealed by resin to be fixed to the support member 40.

Further, in the above-described respective embodiments, the first pair of the first piezoresistive element 26a and the fifth piezoresistive element 26e, and the second pair of the second piezoresistive element 26b and the sixth piezoresistive element 26f may be formed adjacent to the central portion of the first side 24a in the diaphragm 24. Further, the third pair of the third piezoresistive element 26c and the seventh piezoresistive element 26g, and the fourth pair of the fourth piezoresistive element 26d and the eighth piezoresistive element 26h may be formed adjacent to the central portion of the third side 24c in the diaphragm 24. Similarly, the first pair of the first piezoresistive element 26a and the fifth piezoresistive element 26e may be formed adjacent to the central portion of the second side 24b in the diaphragm 24, the second pair of the second piezoresistive element 26b and the sixth piezoresistive element 26f may be formed adjacent to the central portion of the fourth side 24d in the diaphragm 24. The third pair of the third piezoresistive element 26c and the seventh piezoresistive element 26g, and the fourth pair of the fourth piezoresistive element 26d and the eighth piezoresistive element 26h may be formed adjacent to the central portion of the first side 24a in the diaphragm 24.

Further, in the above-described respective embodiments, an example in which the sensor section 10 includes the silicon substrate 20 in which the recess 23 is formed on the front surface thereof, and the base 30 bonded to the rear surface of the silicon substrate 20 is described. However, for example, the sensor section 10 may have the following configuration.

Figure 17:
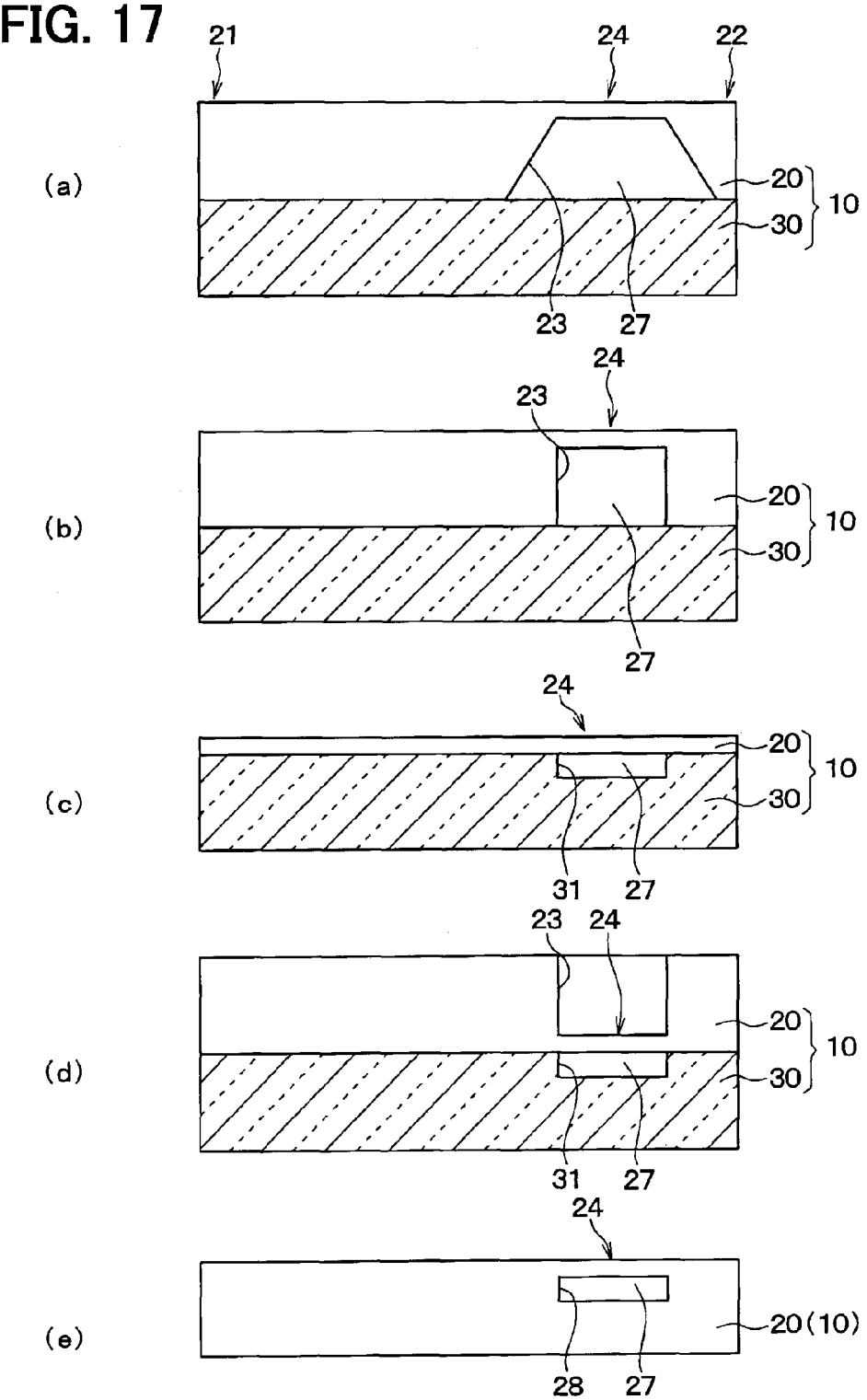
FIGS. 17(a) to 17(e) are cross-sectional views of a sensor section according to another embodiment of the present disclosure.

As shown in FIG. 17(a), the recess 23 having a trapezoid-like cross section may be formed from the rear surface of the silicon substrate 20 to configure the diaphragm 24. Further, as shown in FIG. 17(b), as a modification example of FIG. 17(a), the recess 23 may have a rectangular cross section. In addition, as shown in FIG. 17(c), the silicon substrate 20 may be made thin, the recess 31 may be formed in the base 30, and the diaphragm 24 may be formed in a region of the silicon substrate 20 that faces the recess 31. Further, as shown in FIG. 17(d), as a modification example of the first embodiment, the cross section of the recess 23 formed from the front surface of the silicon substrate 20 may be a rectangular shape. Furthermore, as shown in FIG. 17(e), the sensor section 10 may be formed only by the silicon substrate 20, and a cavity 28 that forms the pressure reference chamber 27 may be formed inside the silicon substrate 20. The silicon substrate 20 is manufactured by forming a recess on a front surface of a substrate formed of silicon, and then, forming an epitaxial layer on the substrate to block the recess using an LPCVD method or the like so that the cavity 28 is formed by the recess.

Further, in the first and third embodiments, an example in which the diaphragm 24 is the square shape is described, but the shape of the diaphragm 24 is not limited thereto.

For example, as shown in FIG. 18(a), the diaphragm 24 may be formed in an octagonal shape that has a first side 24a to a fourth side 24d, a fifth side 24e that connects the first side 24a and the second side 24b, a sixth side 24f that connects the second side 24b and the third side 24c, a seventh side 24g that connects the third side 24c and the fourth side 24d, and an eighth side 24h that connects the fourth side 24d and the first side 24a. Further, as shown in FIG. 18(b), the diaphragm 24 may be formed in a trapezoid-like shape that has the first side to the fourth side 24a to 24d, in which the first side 24a is shorter than the third side 24c. Although not shown particularly, a trapezoid-like shape in which the third side 24c is shorter than the first side 24a may be used.

In addition, as shown in FIG. 18(c), the diaphragm 24 may be formed in a circular shape. In this case, the first piezoresistive element to the eighth piezoresistive element 26a to 26h may be formed in a region excluding a region around an intersection point placed on the side of the fixed end 21, among intersection points where a straight line that is parallel to the [110] direction and passes through the center of the diaphragm 24 intersects an outer contour line that forms the outer appearance of the diaphragm 24. That is, when the external temperature is changed, since the largest thermal stress is generated in a portion closest to the fixed end 21 in the diaphragm 24, the first piezoresistive element to the eighth piezoresistive element 26a to 26h may be formed in a region excluding the portion.

Further, as shown in FIG. 18(d), the diaphragm 24 may be formed in a triangular shape that includes the first side to the third side 24a to 24c, and a vertical angle 24i on the side of the fixed end 21, in which the second side 24b is parallel to the [-110] direction. In this case, since the largest thermal stress is generated in a region around the vertical angle 24*i* in the diaphragm 24, the first piezoresistive element to the eighth piezoresistive element 26*a* to 26*h* may be formed in a region excluding the portion.

Further, in the second embodiment, an example in which the diaphragm 24 is formed in the rectangular shape of which the aspect ratio is larger than 1 is described, but the shape of the diaphragm 24 is not limited thereto.

Figure 18:
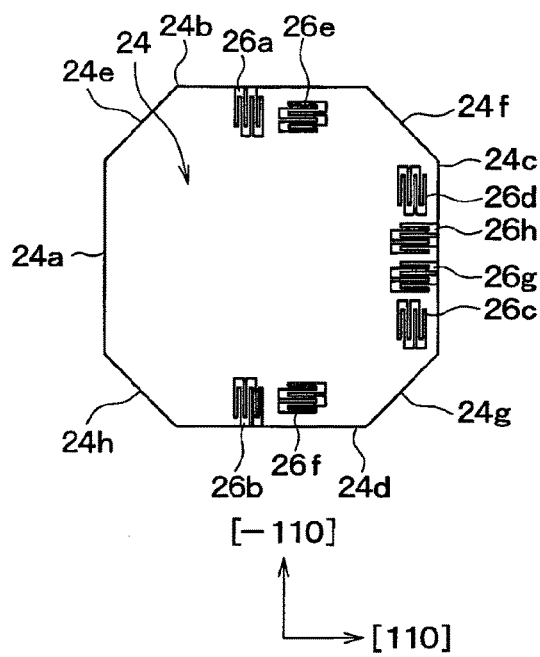
FIGS. 18(a) to 18(d) are plan views of a diaphragm according to another embodiment of the present disclosure.
Figure 18:
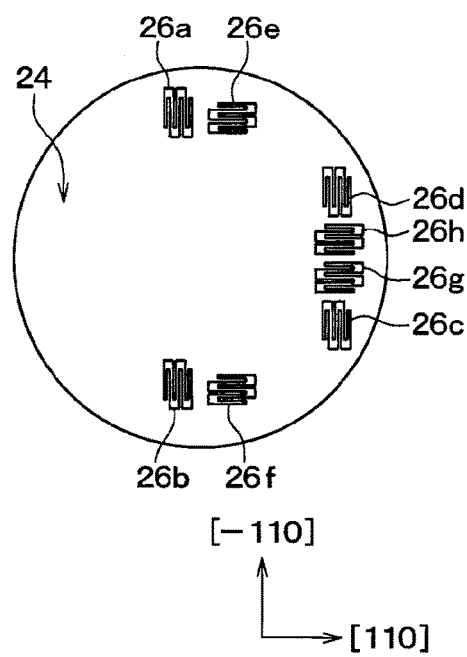
Figure 18:
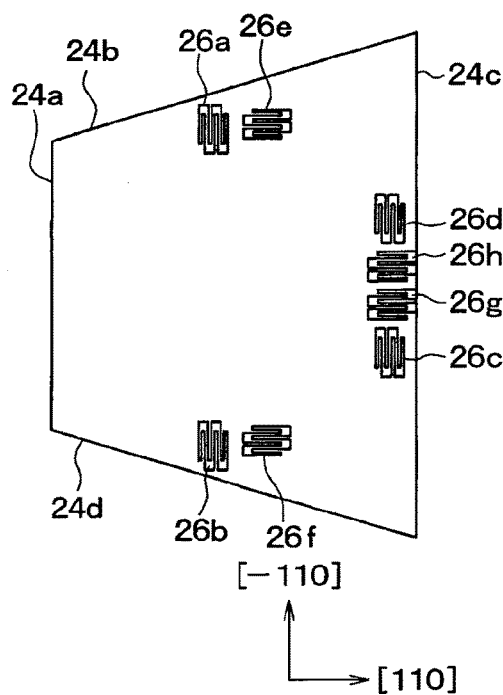
Figure 18:
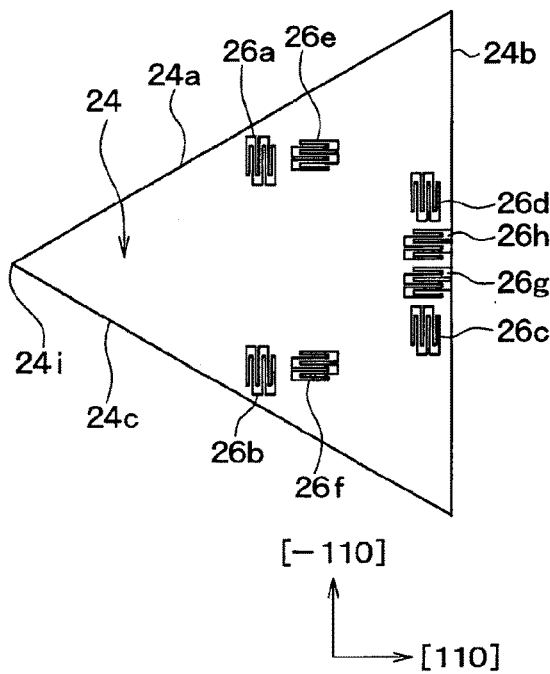
Figure 19:
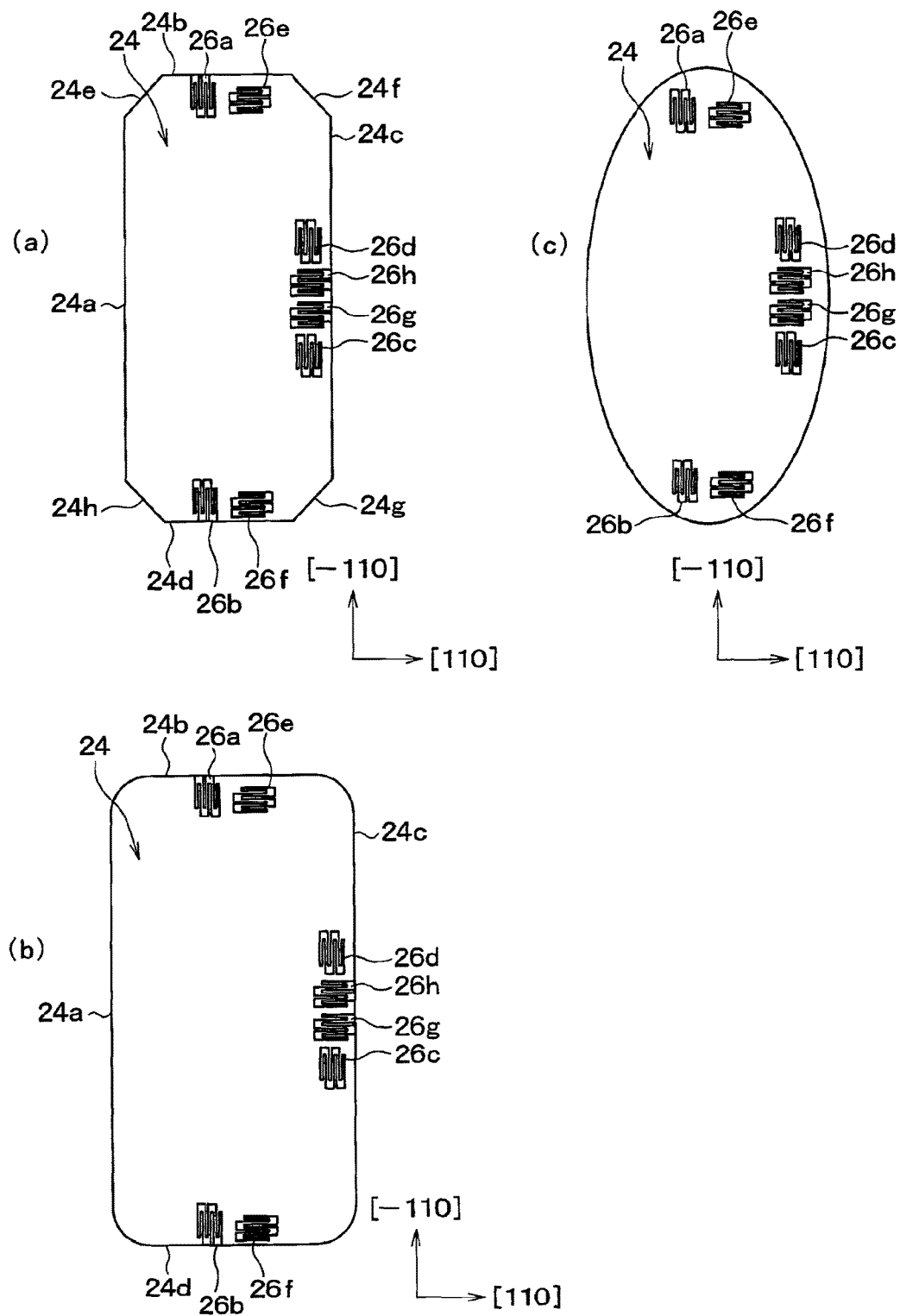
FIGS. 19(a) to 19(c) are plan views of a diaphragm according to another embodiment of the present disclosure.

As shown in FIG. 19(*a*), in the octagonal diaphragm 24 shown in FIG. 18(*a*), the aspect ratio may be set to 1 or greater. Further, as shown in FIG. 19(*b*), the diaphragm 24 shown in FIG. 18(*a*) may be formed in an approximately rectangular shape having roundness in the respective corner portions where the first side to the fourth side 24*a* to 24*d* are connected to each other. In addition, as shown in FIG. 19(*c*), the diaphragm 24 shown in FIG. 18(*c*) may be formed in an elliptical shape of which the aspect ratio is 1 or greater.

Even when the diaphragms 24 shown in FIG. 18(*a*) to FIG. 18(*d*), and FIG. 19(*a*) to FIG. 19(*c*) are used, as described above, by forming the first gauge resistor to the fourth gauge resistor 25*a* to 25*d* by the combined resistance in which the first piezoresistive element to the eighth piezoresistive element 26*a* to 26*h* are appropriately serially connected to each other, and by reducing the difference between the sizes of the thermal stresses applied to the first gauge resistor to the fourth gauge resistor 25*a* to 25*d*, the same effects as in the above-described respective embodiments can be obtained.

In FIG. 18(*a*) to FIG. 18(*d*), and FIG. 19(*a*) to FIG. 19(*c*), a case where the front surface of the silicon substrate 20 is the (001) plane is described, but the shapes of the diaphragm 24 shown in FIG. 18(*a*) to FIG. 18(*d*), and FIG. 19(*a*) to FIG. 19(*c*) may be also applied to the silicon substrate 20 of which the main surface is the (011) plane. In this case, for example, similar to the above-described third embodiment, the first pair of the first piezoresistive element 26*a* and the fifth piezoresistive element 26*e*, and the second pair of the second piezoresistive element 26*b* and the sixth piezoresistive element 26*f* may be formed at the central portion in the diaphragm 24.

Fourth Embodiment

Figure 20:
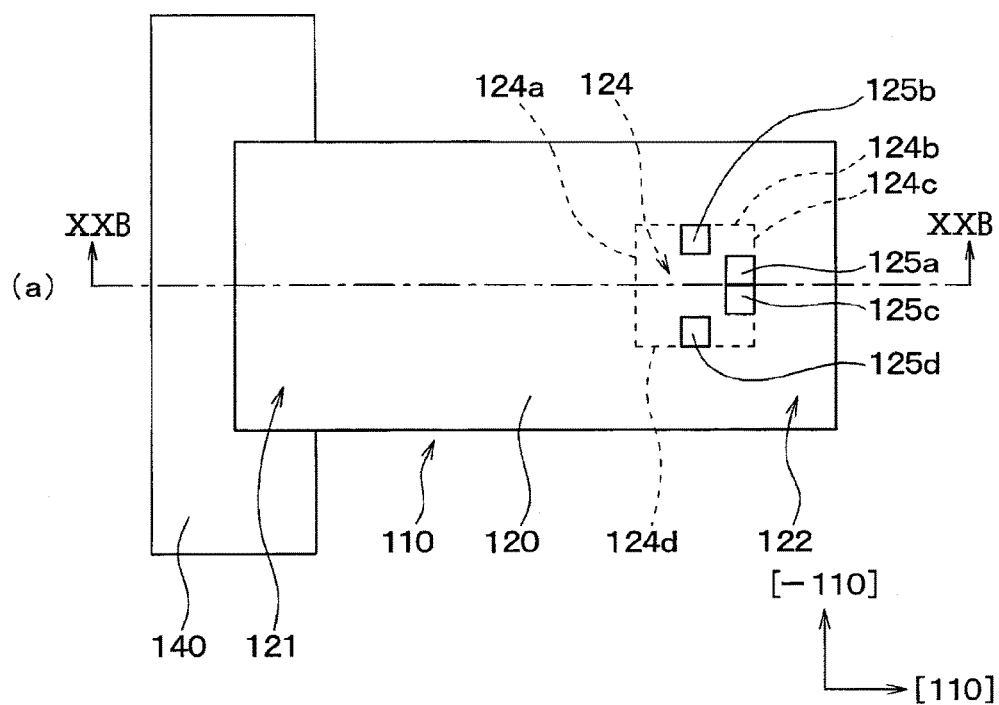
FIG. 20(a) is a plan view of a pressure sensor according to a fourth embodiment of the present disclosure.
FIG. 20(b) is a cross-sectional view taken along line XXB-XXB in FIG. 20(a)
Figure 20:
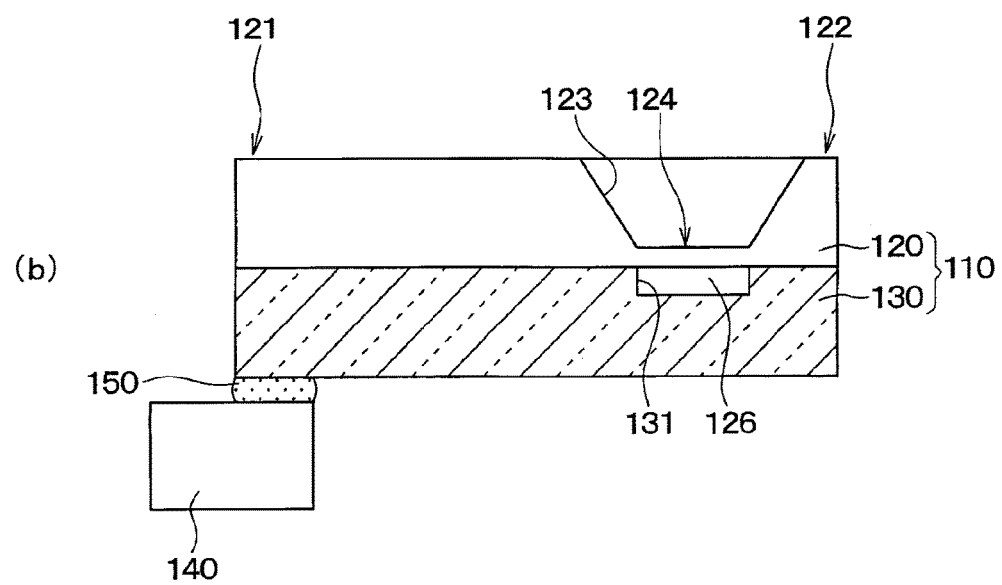

A fourth embodiment of the present disclosure will be described. FIG. 20(*a*) is a plan view of a pressure sensor of the present embodiment, and FIG. 20(*b*) is a cross-sectional view taken along line XXB-XXB in FIG. 20(*a*).

As shown in FIG. 20, the pressure sensor includes a sensor section 110, and a support member 140 that is formed of a resin material or the like and cantilever-supports the sensor section 110.

The sensor section 110 includes a silicon substrate 120 and a base 130 such as a glass substrate, and has a rectangular parallelepiped shape in which one direction thereof is a longitudinal direction. One end in the longitudinal direction is a fixed end 121, and the other end opposite to the one end is a free end 122. Further, the fixed end 121 is bonded to the support member 140 through a bonding member 150 such as an adhesive. That is, the sensor section 110 is cantilever-supported by the support member 140. The longitudinal direction in the present embodiment is the [110] direction.

The silicon substrate 120 is formed in the rectangular parallelepiped shape. In the present embodiment, a main surface thereof corresponds to the (001) plane, and the [110] axis and the [−110] axis are orthogonal to each other on the main surface. Further, in the silicon substrate 120, a recess 123 having a trapezoid-like cross section formed by performing anisotropic etching or the like on the front surface is formed on the side of the free end 122 with reference to the side of the fixed end 121, so that a diaphragm 124 is formed by a thin portion according to the recess 123. The reason why the diaphragm 124 is formed on the side of the free end 122 is because thermal stress generated in the diaphragm 124 decreases when an external temperature is changed, compared with a case where the diaphragm 124 is formed on the side of the fixed end 121.

Further, the rectangular parallelepiped base 130 formed of a glass substrate, a silicon substrate or the like is bonded to a rear surface of the silicon substrate 120. A recess 131 is formed in a region of the base 130 that faces the bottom surface of the recess 123. Thus, a pressure reference chamber 126 is formed by the recess 131 and the silicon substrate 120. In the present embodiment, the pressure reference chamber 126 has a vacuum pressure, but for example, may have an atmospheric pressure.

In the present embodiment, the diaphragm 124 has a configuration in which a first side 124*a* to a fourth side 124*b* of an outer contour line (line indicated by a dashed line in FIG. 20(*a*)) are parallel to the <110> direction, and a planar shape thereof is a square shape. Specifically, the first side 124*a* and a third side 124*c* that face each other among the first side to the fourth side 124*a* to 124*d* are parallel to the [−110] direction, and a second side 124*b* and the fourth side 124*d* that face each other are parallel to the [110] direction. Further, the diaphragm 124 is formed so that the first side 124*a* is located on the side of the fixed end 121. In the present embodiment, the [110] direction corresponds to a first direction of the present disclosure, and the [−110] direction corresponds to a second direction of the present disclosure.

Further, a first piezoresistive element to a fourth piezoresistive element 125*a* to 125*d* of which a resistance value varies by stress are provided to form a Wheatstone bridge (full bridge) circuit on the diaphragm 124. Specifically, the first piezoresistive element to the fourth piezoresistive element 125*a* to 125*d* are formed in a region excluding a region around a middle point of the first side 124*a* in the diaphragm 124. That is, the first piezoresistive element to the fourth piezoresistive element 125*a* to 125*d* are formed in a region excluding the vicinity of the middle point of the first side 124*a*, and are formed so as not to be in contact with the middle point of the first side 124*a*. In other words, the first piezoresistive element to the fourth piezoresistive element 125*a* to 125*d* are formed in a region excluding a portion where the largest thermal stress is generated in the diaphragm 124 when the external temperature is changed.

In the present embodiment, the first piezoresistive element 125*a* and the third piezoresistive element 125*c* are formed adjacent to a central portion of the third side 124*c*, the second piezoresistive element 125*b* is formed adjacent to a central portion of the second side 124*b*, and the fourth piezoresistive element 125*d* is formed adjacent to a central portion of the fourth side 124*d*. That is, the first piezoresistive element to the fourth piezoresistive element 125*a* to 125*d* are formed on the side of the free end 122 in the diaphragm 124 as a whole. The reason why the first piezoresistive element to the fourth piezoresistive element 125*a* to 125*d* are formed adjacent to the central portions of the second side 124*b* to the fourth side 124*d* is because when the main surface of the silicon substrate 120 is the (001) plane, the central portions of the second side 124*b* to the fourth side 124*d* are easily distorted when pressure is applied to the diaphragm 124.

Figure 21:
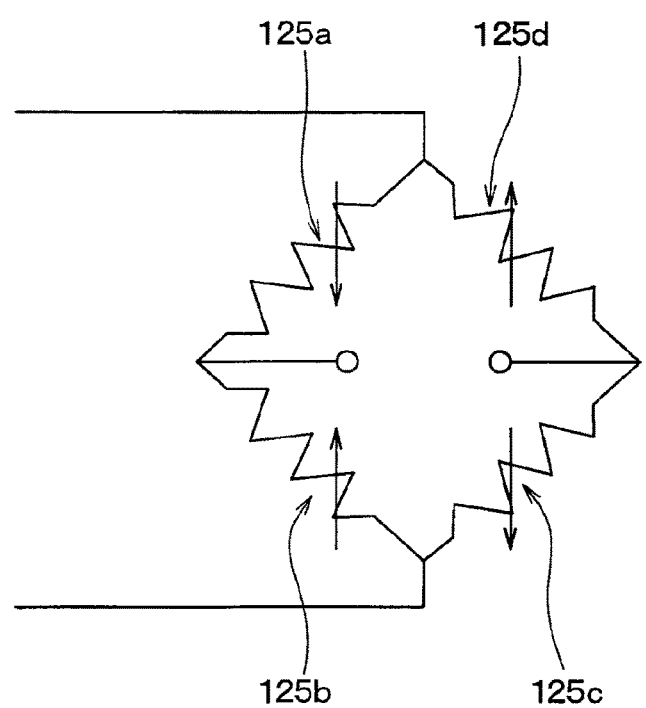
FIG. 21 is a circuit diagram of a bridge circuit.

FIG. 21 is a circuit diagram of the bridge circuit. As shown in FIG. 21, in the present embodiment, the first piezoresistive element to the fourth piezoresistive element 125a to 125d form a quadrangular closed circuit in which the first piezoresistive element 125a is serially connected to the second piezoresistive element 125b and the fourth piezoresistive element 125d, and the third piezoresistive element 125c is serially connected to the second piezoresistive element 125b and the fourth piezoresistive element 125d. In FIG. 21, arrows directed downward on the plane of the figure shown over the first piezoresistive element 125a and the third piezoresistive element 125c represent that the resistance values decrease when pressure is applied to the diaphragm 124, and arrows directed upward on the plane of the figure shown over the second piezoresistive element 125b and the fourth piezoresistive element 125d represent that the resistance values increase when pressure is applied to the diaphragm 124.

The first piezoresistive element to the fourth piezoresistive element 125a to 125d are formed as resistances formed by diffusion or the like, and are formed in a zigzag shape in which a straight line is repeatedly bent. Further, in the present embodiment, the first piezoresistive element to the fourth piezoresistive element 125a to 125d have the zigzag shape in which a direction where the resistance value is changed when stress is applied to the diaphragm 124 is a longitudinal direction. Here, the longitudinal direction is the [110] direction. That is, in the present embodiment, a portion that extends in the longitudinal direction becomes a portion where the resistance value is changed.

Figure 22:
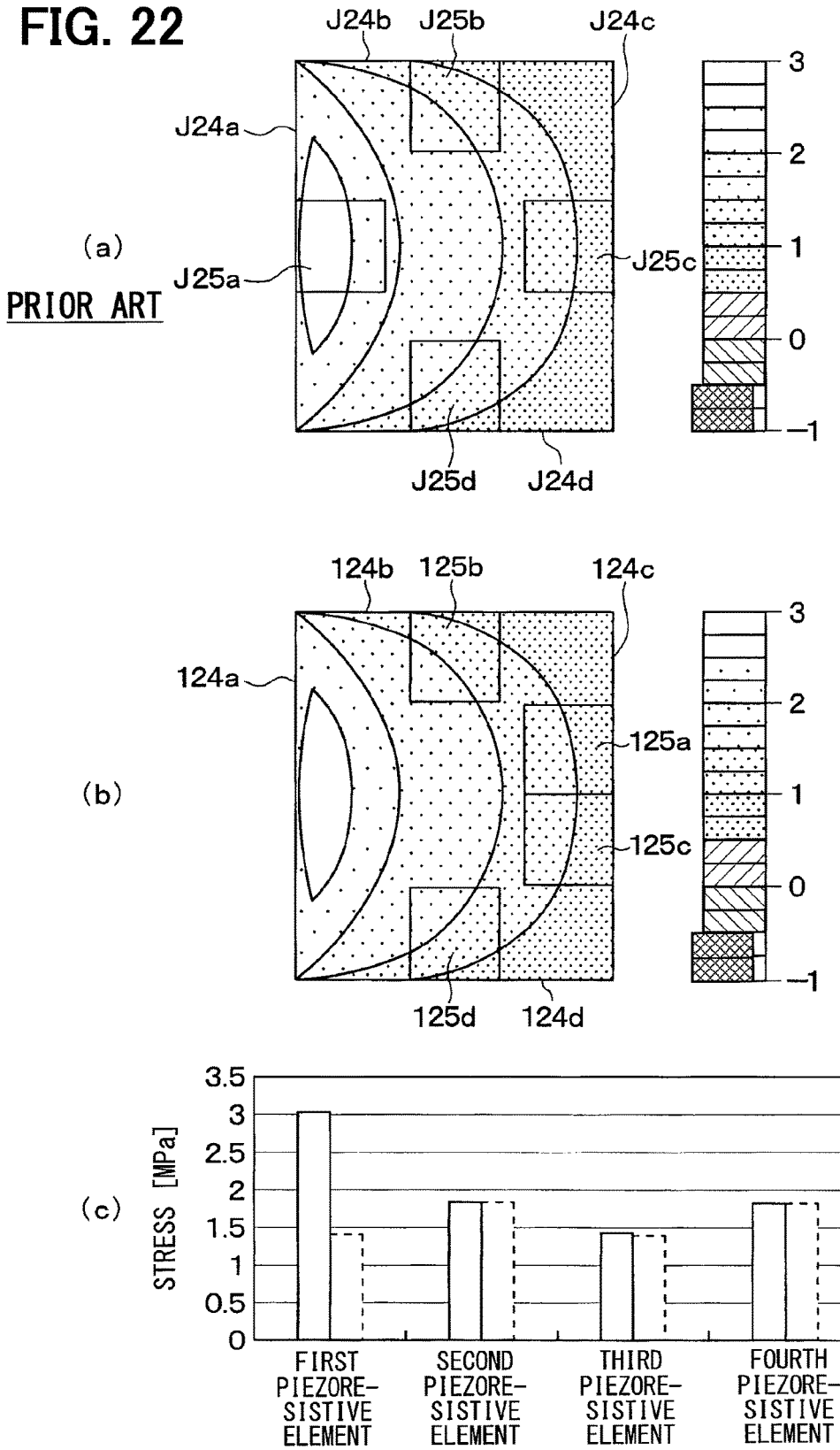
FIG. 22 shows a simulation result illustrating a thermal stress generated in a diaphragm when an external temperature is 150° C.
Figure 23:
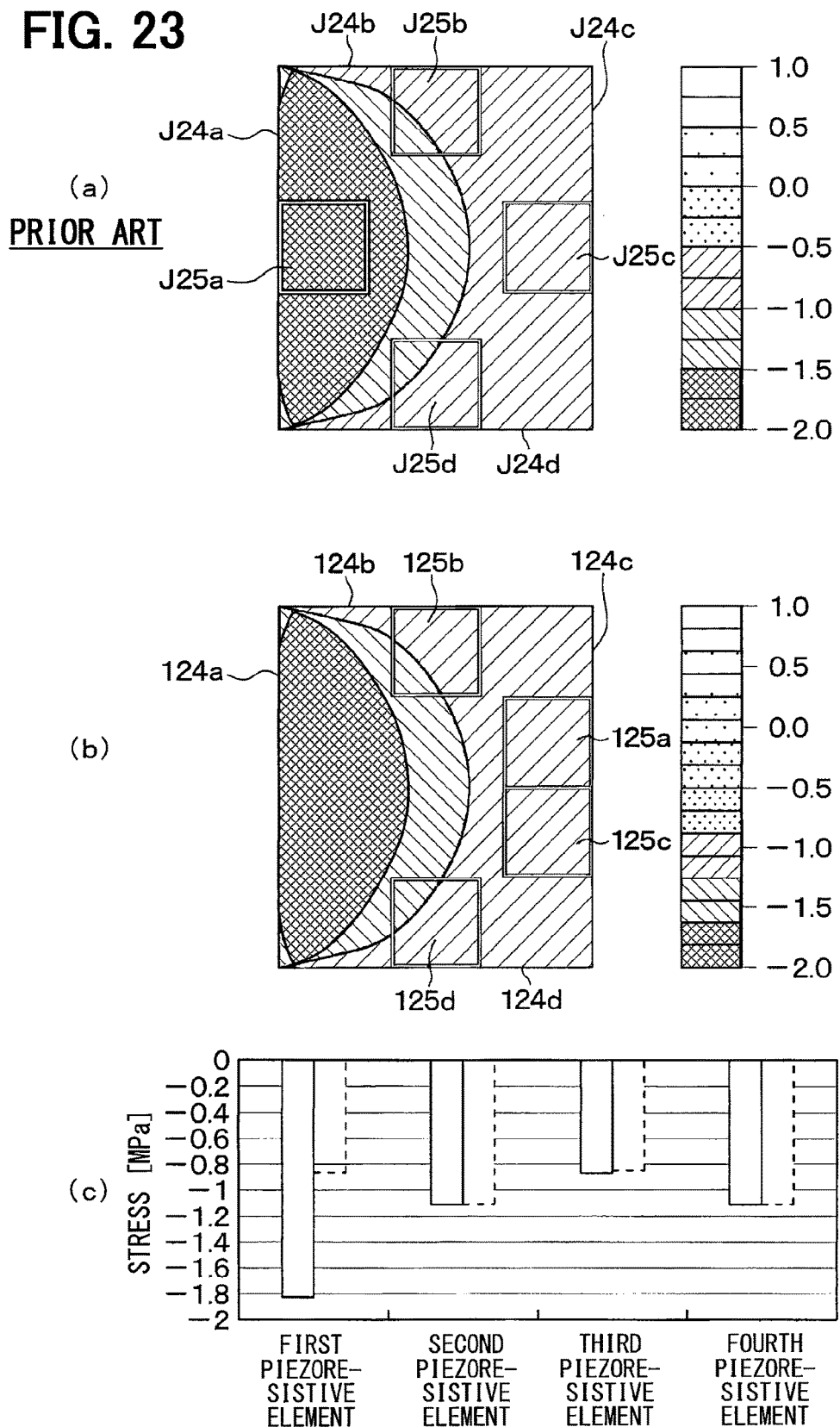
FIG. 23 shows a simulation result illustrating a thermal stress generated in a diaphragm when an external temperature is −40° C.

Next, the thermal stress generated in the diaphragm 124 when the external temperature is changed will be described. FIGS. 22A to 22C show simulation results illustrating thermal stresses generated in the diaphragm 124 when the external temperature is 150° C. FIG. 22A is a stress distribution diagram of the diaphragm J24 in a pressure sensor in the related art, FIG. 22B is a stress distribution diagram of the diaphragm 124 in the pressure sensor of the present embodiment, and FIG. 22C is a diagram illustrating an average value of stresses generated in the region where the first piezoresistive element to the fourth piezoresistive element 125a to 125d are formed in the diaphragm 124. Further, FIGS. 23A to 23C show simulation results illustrating thermal stresses generated in the diaphragm 124 when the external temperature is −40° C. FIG. 23A is a stress distribution diagram of the diaphragm J24 in the pressure sensor in the related art, FIG. 23B is a stress distribution diagram of the diaphragm 124 in the pressure sensor of the present embodiment, and FIG. 23C is a diagram illustrating an average value of stresses generated in the region where the first piezoresistive element to the fourth piezoresistive element 125a to 125d are formed in the diaphragm 124. The pressure sensor in the related art represents a pressure sensor in which the first piezoresistive element to the fourth piezoresistive element J25a to J25d are respectively formed adjacent to the central portions of the first side to the fourth side J24a to J24d as shown in FIG. 6.

Further, FIGS. 22A and 22B, and FIGS. 23A and 23B show thermal stresses generated in the diaphragm 124 in accordance with gradation, in which a tensile stress of a portion that contributes to the piezoelectric resistance effect increases as the concentration becomes thin, and a compression stress of a portion that contributes to the piezoelectric resistance effect increases as the concentration becomes thick. Further, in FIG. 22C and FIG. 23C, a solid line bar graph shows a thermal stress generated in the region where the first piezoresistive element to the fourth piezoresistive element 125a to 125d are formed in the pressure sensor in the related art, and a broken line bar graph shows a thermal stress generated in the region where the first piezoresistive element to the fourth piezoresistive element 125a to 125d are formed in the pressure sensor in the present embodiment. Eight bar graphs are sequentially arranged from the left, in which two bar graphs located at the left end represent an average stress generated in the region where the first piezoresistive element 125a is formed, two bar graphs located in the second place from the left represent an average stress generated in the region where the second piezoresistive element 125b is formed, two bar graphs located in the third place from the left represent an average stress generated in the region where the third piezoresistive element 125c is formed, and two bar graphs located at the right end represent an average stress generated in the region where the fourth piezoresistive element 125d is formed.

As shown in FIG. 22A to FIG. 22C and FIG. 23A to FIG. 23C, when the external temperature is 150° C. or −40° C., the thermal stress is generated in the diaphragm 124 due to bending of the sensor section 110, or the like. Here, the thermal stress becomes the largest generated in the region around the middle point of the first side 124a closest to the fixed end 121 in the diaphragm 124, that is, the central portion of the first side 124a, and the thermal stress becomes smaller while radially expanding from the central portion.

Further, in the pressure sensor in the related art, since the first piezoresistive element to the fourth piezoresistive element J25a to J25d are formed adjacent to the central portions of the first side to the fourth side J24a to J24d, when the external temperature is changed, a large thermal stress is applied to the first piezoresistive element J25a formed adjacent to the central portion of the first side J24a, compared with the second piezoresistive element J25b to the fourth piezoresistive element J25d. In other words, the first piezoresistive element J25a is formed in the portion where the largest thermal stress is generated in the diaphragm J24.

On the other hand, in the present embodiment, since the first piezoresistive element 125a and the third piezoresistive element 125c are formed adjacent to the central portion of the third side 124c, the thermal stress applied to the first piezoresistive element 125a can be made approximately the same as the thermal stress applied to the third piezoresistive element 125c. That is, in the pressure sensor of the present embodiment, when the external temperature is changed from 150° to −40° C., the difference of the thermal stresses applied to the first piezoresistive element to the fourth piezoresistive element 125a to 125d can be reduced, compared with the pressure sensor in the related art. Thus, the reduction of pressure detection accuracy can be suppressed.

Further, in the pressure sensor with the configuration described above, the detection signal output from the bridge circuit is amplified by a predetermined multiple using an amplifier circuit, and the pressure is measured based on the amplified signal. Thus, an error of the amplified signal becomes larger as the maximum value of the thermal stresses applied to the first piezoresistive element to the fourth piezoresistive element 125a to 125d becomes larger. However, in the present embodiment, since the first piezoresistive element to the fourth piezoresistive element 125a to 125d are formed in the region excluding the region around the middle point of the first side 124a, when the external temperature is changed, the absolute value of the maximum value of the thermal stresses applied to the first piezoresistive element to the fourth piezoresistive element 125a to 125d can be also reduced. That is, for example, when the external temperature is 150° C., in the pressure sensor in the related art, 3 MPa applied to the first piezoresistive element 125*a* becomes the maximum value of the stresses. However, in the pressure sensor of the present embodiment, 1.8 Mpa applied to the second piezoresistive element 125*b* and the fourth piezoresistive element 125*d* becomes the maximum value of the stresses. Accordingly, the error of the amplified signal can be reduced, and the reduction of pressure detection accuracy can be further suppressed.

As described above, in the pressure sensor of the present embodiment, the first piezoresistive element 125*a* and the third piezoresistive element 125*c* are formed adjacent to the central portion of the third side 124*c*, the second piezoresistive element 125*b* is formed adjacent to the central portion of the second side 124*b*, and the fourth piezoresistive element 125*d* is formed adjacent to the central portion of the fourth side 124*d*. Thus, when the thermal stress is generated in the diaphragm 124 according to the change of the external temperature, since the first piezoresistive element to the fourth piezoresistive element 125*a* to 125*d* are not formed in the portion where the largest thermal stress is generated in the diaphragm 124, the difference of the thermal stresses applied to the first piezoresistive element to the fourth piezoresistive element 125*a* to 125*d* can be reduced, and the reduction of pressure detection accuracy can be suppressed.

Further, since the first piezoresistive element to the fourth piezoresistive element 125*a* to 125*d* are not formed in the portion where the largest thermal stress is generated in the diaphragm 124, the maximum value of the absolute values of the thermal stresses applied to the first piezoresistive element to the fourth piezoresistive element 125*a* to 125*d* can be reduced. Accordingly, the error of the amplified signal can be reduced, and the reduction of pressure detection accuracy can be further suppressed.

That is, for example, it is considered that the difference of the thermal stresses applied to the respective piezoresistive elements 125*a* to 125*d* is reduced when the external temperature is changed by forming the first piezoresistive element to the fourth piezoresistive element 125*a* to 125*d* adjacent to the central portion of the first side 124*a*, but in this pressure sensor, the applied thermal stress becomes larger, and thus, the error of the amplified signal becomes larger. On the other hand, in the present embodiment, the error of the amplified signal can be suppressed, and the reduction of pressure detection accuracy can be suppressed.

Fifth Embodiment

Figure 24:
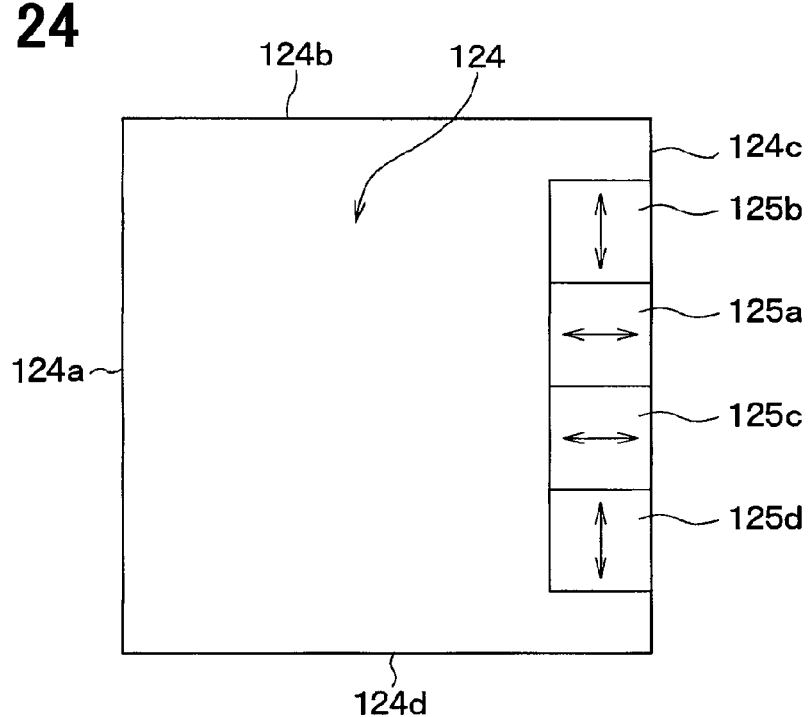
FIG. 24 is a plan view of a diaphragm according to a fifth embodiment of the present disclosure.

A fifth embodiment of the present disclosure will be described. A pressure sensor of the present embodiment is configured so that the places where the second piezoresistive element 125*b* and the fourth piezoresistive element 125*d* are formed are changed compared with the fourth embodiment. Since the other configurations of the fifth embodiment are the same as those of the first embodiment, the description will not be repeated. FIG. 24 is a plan view of a diaphragm 124 in the present embodiment.

As shown in FIG. 24, the first piezoresistive element to the fourth piezoresistive element 125*a* to 125*d* are formed adjacent to each other, and are formed adjacent to the third side 124*c*. Further, the second piezoresistive element 125*b* is formed on a side opposite to the third piezoresistive element 125*c* with the first piezoresistive element 125*a* being interposed therebetween, and the fourth piezoresistive element 125*d* is formed on a side opposite to the first piezoresistive element 125*a* with the third piezoresistive element 125*c* being interposed therebetween.

In this case, when pressure is applied to the diaphragm 124 from the measurement medium, since the first piezoresistive element to the fourth piezoresistive element 125*a* to 125*d* are all formed adjacent to the third side 124*c*, stresses having the same sign are applied to the first piezoresistive element to the fourth piezoresistive element 125*a* to 125*d*. That is, the same tensile stress or compression stress is applied to the first piezoresistive element to the fourth piezoresistive element 125*a* to 125*d*. Thus, in order to detect an output from the bridge circuit shown in FIG. 21, in the present embodiment, the longitudinal direction of the first piezoresistive element 125*a* and the third piezoresistive element 125*c* is set to the [110] direction, and the longitudinal direction of the second piezoresistive element 125*b* and the fourth piezoresistive element 125*d* is set to the [−110] direction. That is, the longitudinal direction of the first piezoresistive element 125*a* and the third piezoresistive element 125*c* is orthogonal to the longitudinal direction of the second piezoresistive element 125*b* and the fourth piezoresistive element 125*d*. Arrows shown in the first piezoresistive element to the fourth piezoresistive element 125*a* to 125*d* in FIG. 24 represent the longitudinal directions.

In the pressure sensor with such a configuration, since the first piezoresistive element to the fourth piezoresistive element 125*a* to 125*d* are respectively formed adjacent to the third side 124*c*, when the external temperature is changed, the difference of the thermal stresses applied to the first piezoresistive element to the fourth piezoresistive element 125*a* to 125*d* can be further reduced, compared with the above-described first embodiment. Further, since the second piezoresistive element 125*b* and the fourth piezoresistive element 125*d* are formed at a position separated from the fixed end 121, compared with the first embodiment, when the external temperature is changed, the absolute value of the maximum value of the thermal stresses applied to the first piezoresistive element to the fourth piezoresistive element 125*a* to 125*d* can be reduced. Accordingly, when the external temperature is changed, the reduction of pressure detection accuracy can be suppressed, compared with the first embodiment.

Sixth Embodiment

Figure 25:
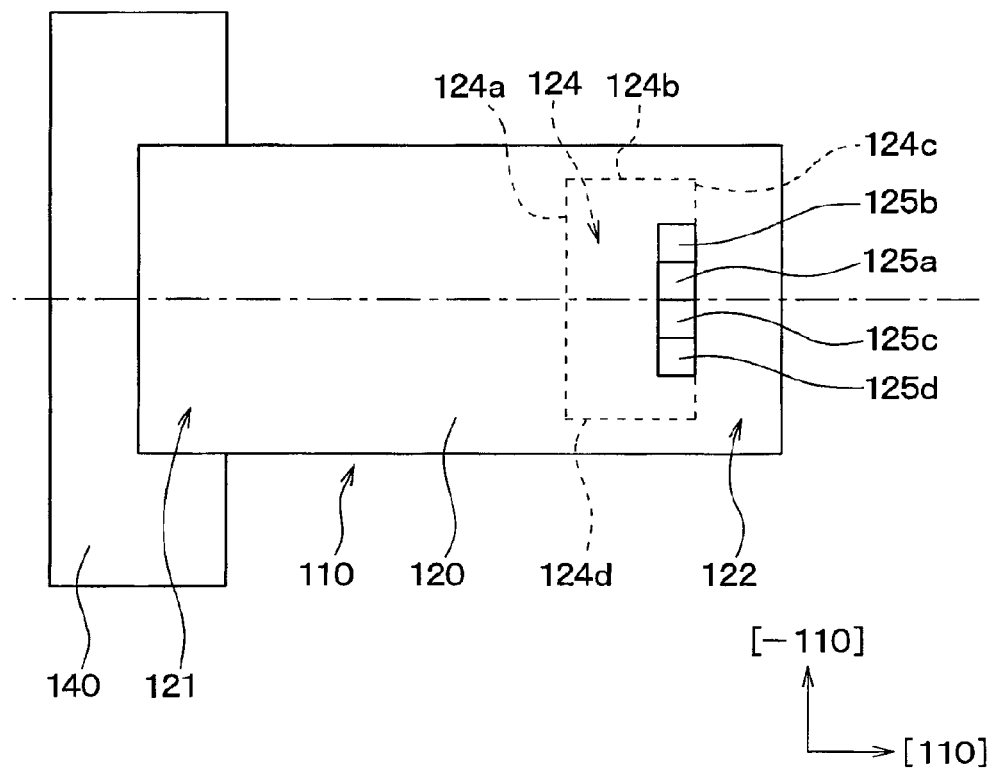
FIG. 25 is a plan view of a pressure sensor according to a sixth embodiment of the present disclosure.

A sixth embodiment of the present disclosure will be described. A pressure sensor of the present embodiment is configured so that the shape of the diaphragm 124 is changed compared with the fifth embodiment. Since the other configurations of the sixth embodiment are the same as those of the fifth embodiment, the description will not be repeated. FIG. 25 is a plan view of the pressure sensor in the present embodiment.

As shown in FIG. 25, when the ratio of (length in [−110] direction)/(length in [110] direction) is represented as the aspect ratio, the diaphragm 124 is formed in a rectangular shape of which the aspect ratio is larger than 1. In such a pressure sensor, when the external temperature is changed, the thermal stress generated in the diaphragm 124 can be reduced. Further, the reduction of pressure detection accuracy can be suppressed.

Figure 26:
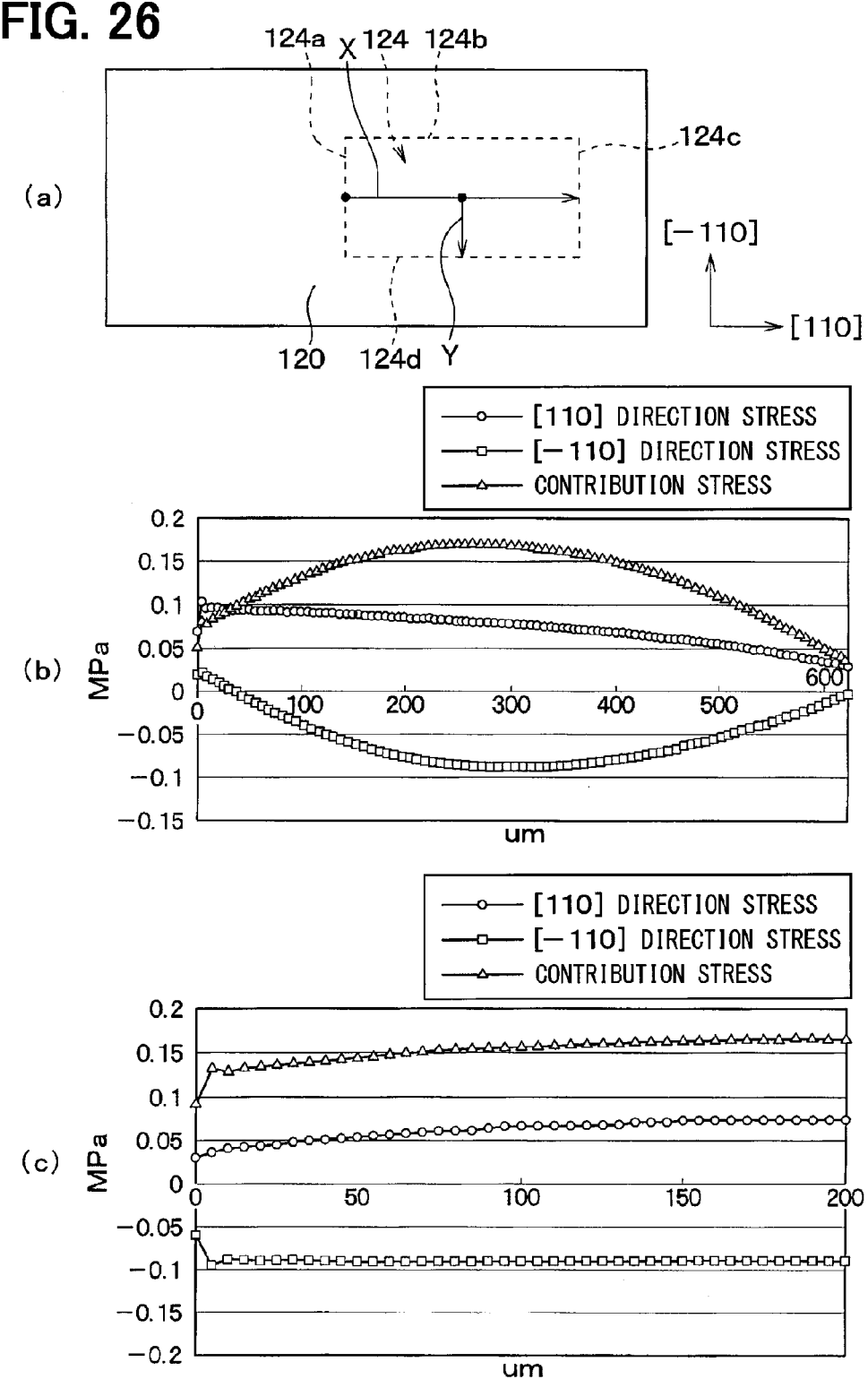
FIG. 26(a) is a plan view of a sensor section of which an aspect ratio of a diaphragm is smaller than 1.
FIG. 26(b) and FIG. 26(c) are simulation results illustrating thermal stresses generated in the diaphragm when an external temperature is 150° C.
Figure 27:
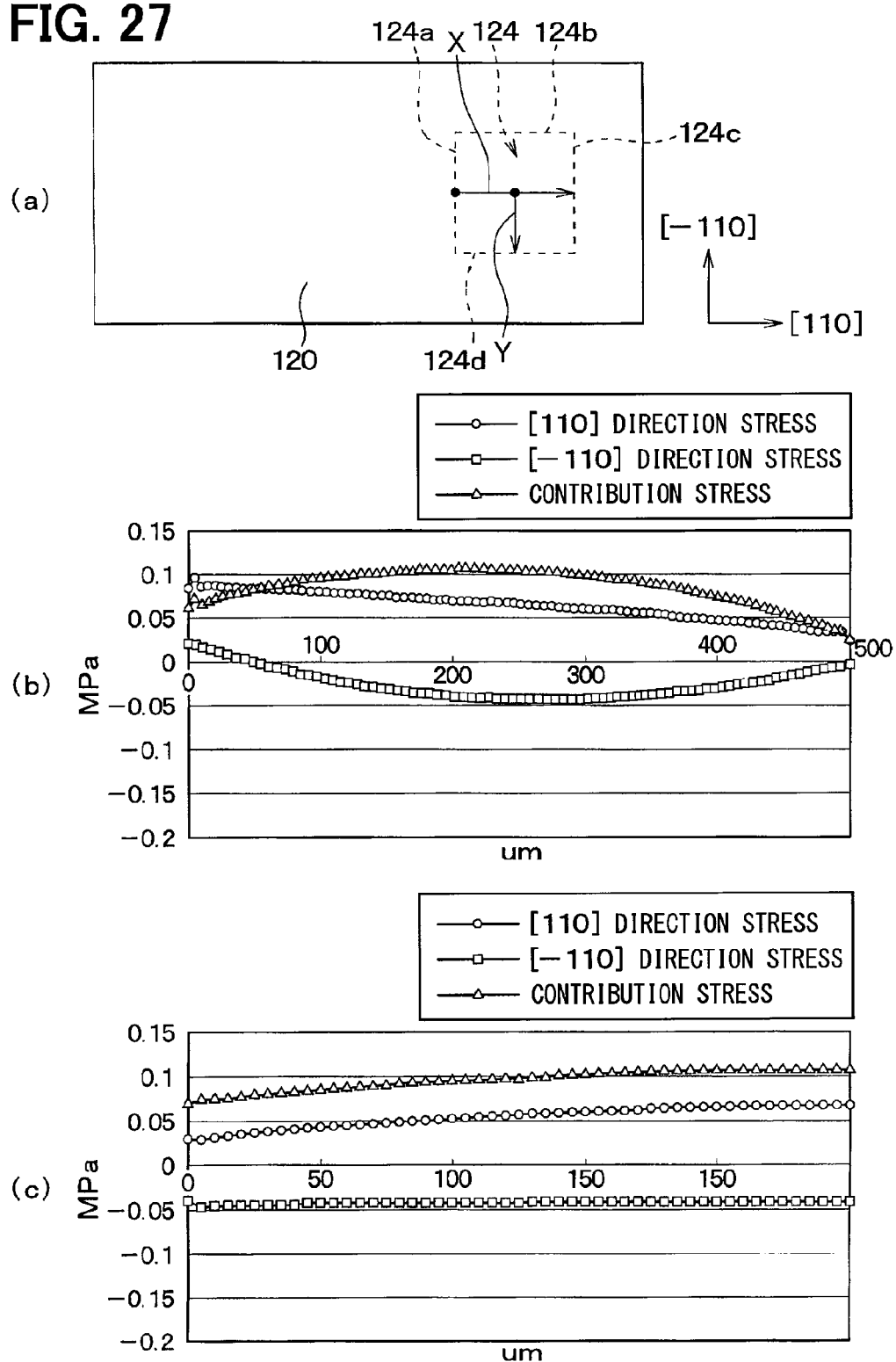
FIG. 27(a) is a plan view of a sensor section of which an aspect ratio of a diaphragm is 1.
FIG. 27(b) and FIG. 27(c) are simulation results illustrating thermal stresses generated in the diaphragm when an external temperature is 150° C.
Figure 28:
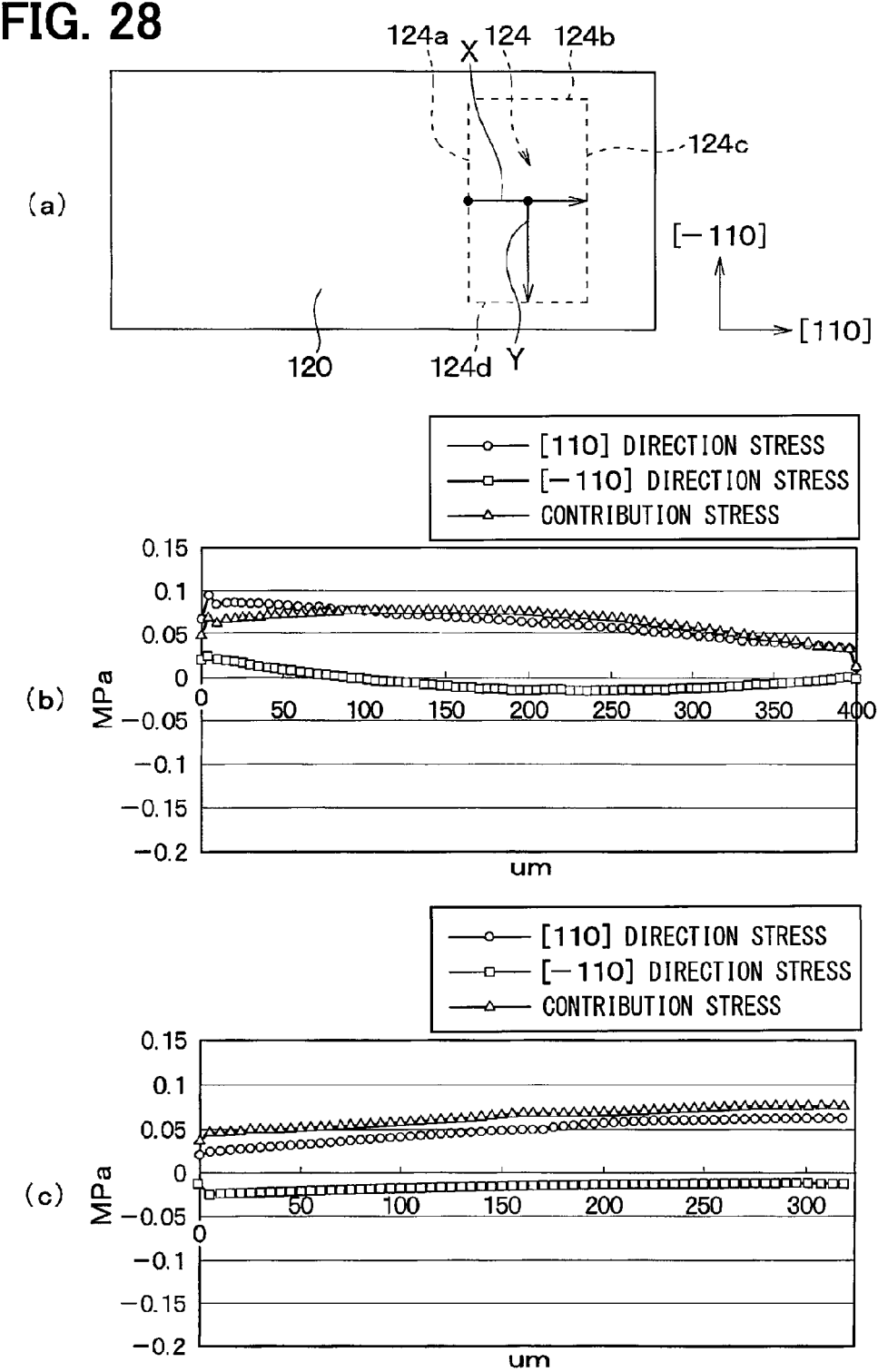
FIG. 28(a) is a plan view of a sensor section of which an aspect ratio of a diaphragm is larger than 1.
FIG. 28(b) and FIG. 28(c) are simulation results illustrating thermal stresses generated in the diaphragm when an external temperature is 150° C.

FIG. 26(*a*) is a plan view of a sensor section 110 of which the aspect ratio of the diaphragm 124 is smaller than 1, and FIG. 27(*a*) is a plan view of a sensor section of which the aspect ratio of the diaphragm 124 is 1, and FIG. 28(*a*) is a plan view of a sensor section of which the aspect ratio of the diaphragm 124 is larger than 1. FIG. 26(*b*) and FIG. 26(*c*), FIG. 27(*b*) and FIG. 27(*c*), and FIG. 28(*b*) and FIG. 28(*c*)

show simulation results illustrating thermal stresses generated in the diaphragm 124 when the external temperature is 150° C. In FIG. 26(a) and FIG. 26(c), FIG. 27(b) and FIG. 27(c), and FIG. 28(b) and FIG. 28(c), FIG. 26(b), FIG. 27(b) and FIG. 28(b) show simulation results illustrating thermal stresses along the X direction in FIG. 26(a), FIG. 27(a) and FIG. 28(a), and FIG. 26(c), FIG. 27(c) and FIG. 28(c) show simulation results illustrating thermal stresses along the Y direction in FIG. 26(a), FIG. 27(a) and FIG. 28(a).

In FIG. 26(b) and FIG. 26(c), FIG. 27(b) and FIG. 27(c), and FIG. 28(b) and FIG. 28(c), a circle represents a thermal stress in the [110] direction, a square represents a thermal stress in the [−110] direction, and a triangle represents a thermal stress that contributes to the piezoelectric resistance effect (simply shown as contribution stress in the figure). Further, in FIG. 26(a), FIG. 27(a) and FIG. 28(a), the first piezoresistive element to the fourth piezoresistive element 125a to 125d are not shown.

When referring to the diaphragm 124 of which the aspect ratio is 1, as shown in FIGS. 27(a) to 27(c), in the diaphragm 124 of which the aspect ratio is larger than 1, as shown in FIGS. 28(a) to 28(c), the thermal stress that contributes to the piezoelectric resistance effect decreases, but in the diaphragm 124 of which the aspect ratio is smaller than 1, as shown in FIGS. 26(a) to 26(c), the thermal stress that contributes to the piezoelectric resistance effect increases.

The reason is considered as follows. That is, since the sensor section 110 is formed in the rectangular parallelepiped shape in which the [110] direction is the longitudinal direction and the fixed end 121 is fixed to the support member 140, when the external temperature is changed, the sensor section 110 is easily bent with reference to the axis of the [−110] direction, That is, the free end 122 is easily displaced in the vertical direction. Further, the direction where the diaphragm 124 is easily bent is changed according to the aspect ratio, That is, when the aspect ratio is larger than 1, the diaphragm 124 is easily bent with reference to the axis of the [110] direction, and when the aspect ratio is smaller than 1, the diaphragm 124 is easily bent with reference to the axis of the [−110] direction.

That is, in the diaphragm 124 of which the aspect ratio is equal to or smaller than 1, when the external temperature is changed, the direction where the sensor section 110 is easily bent and the direction where the diaphragm 124 is easily bent are the same, and thus, the thermal stress generated in the diaphragm 124 increases. On the other hand, in the diaphragm 124 of which the aspect ratio is larger than 1, since the direction where the sensor section 110 is easily bent and the direction where the diaphragm 124 is easily bent intersect each other, the thermal stress generated in the diaphragm 124 decreases, compared with the pressure sensor of which the aspect ratio is equal to or smaller than 1.

Accordingly, in the present embodiment, the thermal stress generated in the diaphragm 124 can be reduced, and the reduction of pressure detection accuracy can be suppressed. In the present embodiment, an example in which the first piezoresistive element to the fourth piezoresistive element 125a to 125d are formed adjacent to the third side 124c is described, but the second piezoresistive element 125b may be formed adjacent to the central portion of the second side 124b, and the fourth piezoresistive element 125d may be formed adjacent to the central portion of the fourth side 124d, as described in the first embodiment.

Seventh Embodiment

A seventh embodiment of the present disclosure will be described. A pressure sensor of the present embodiment is configured so that the surface orientation of the main surface of the silicon substrate 120 is changed compared with the fourth embodiment. Since the other configurations of the seventh embodiment are the same as those of the fourth embodiment, the description will not be repeated. Hg. 29 is a plan view of a pressure sensor according to the seventh embodiment of the present disclosure.

Figure 29:
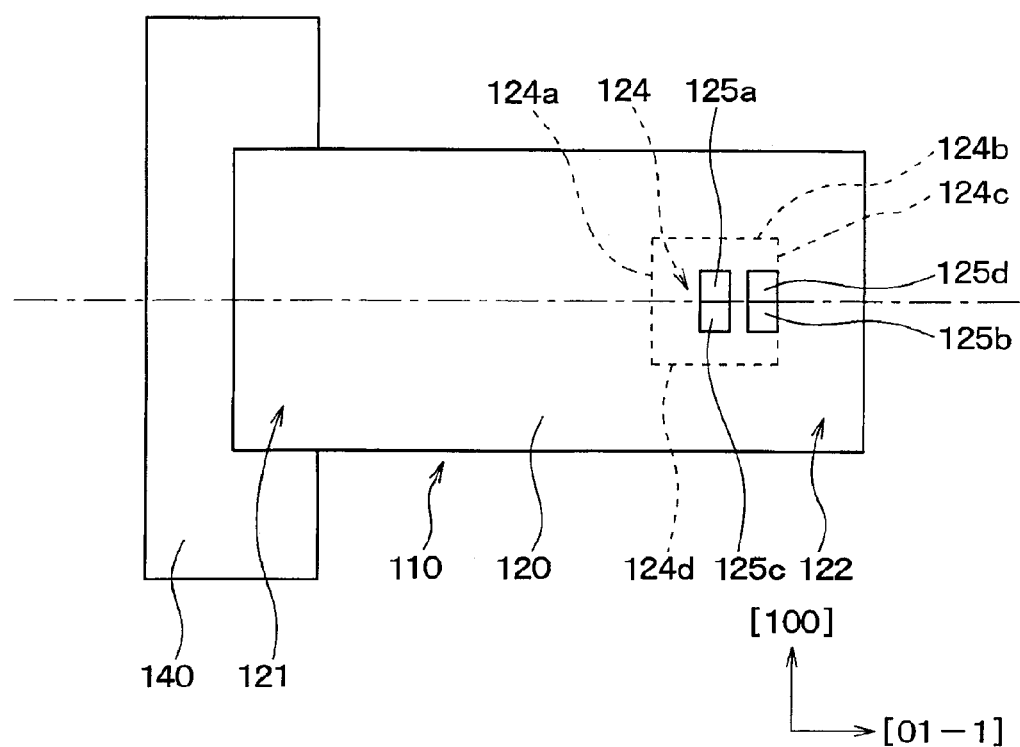
FIG. 29 is a plan view of a pressure sensor according to a seventh embodiment of the present disclosure.

As shown in FIG. 29, the silicon substrate 120 of the present embodiment has a configuration in which a main surface is the (011) plane. On the main surface, the [014] axis and the [100] axis are present so as to be orthogonal to each other. In this way, when the silicon substrate 120 of which the main surface is the (011) plane is used, when pressure is applied to the diaphragm 124 from a measurement medium, a large difference occurs between a central region and a peripheral region along the [01-1] axis direction from the center. Accordingly, in the present embodiment, the first piezoresistive element 125a and the third piezoresistive element 125c are disposed at the central portion of the diaphragm 124, and the second piezoresistive element 125b and the fourth piezoresistive element 125d are disposed at the central portion of the third side 124c.

In this way, even when the substrate of which the main surface is the (011) plane is used as the silicon substrate 120, similar to the above-described fourth embodiment, since the first piezoresistive element to the fourth piezoresistive element 125a to 125d are formed in a region excluding the region around the middle point of the first side 124a, when the external temperature is changed, the reduction of pressure detection accuracy can be suppressed.

Other Embodiments

In the above-described respective embodiments, an example in which the fixed end 121 of the sensor section 110 is fixed to the support member 140 through the bonding member 150 is described. However, for example, the fixed end 121 of the sensor section 110 may be sealed by resin to be fixed to the support member 140.

Further, in the above-described respective embodiments, an example in which the sensor section 110 includes the silicon substrate 120 in which the recess 123 is formed on the rear surface thereof, and the base 130 bonded to the rear surface of the silicon substrate 120 is described. However, for example, the sensor section 110 may have the following configuration. FIGS. 30A to 30E are diagrams illustrating configurations of cross sections of the sensor section 110 according to other embodiments.

Figure 30:
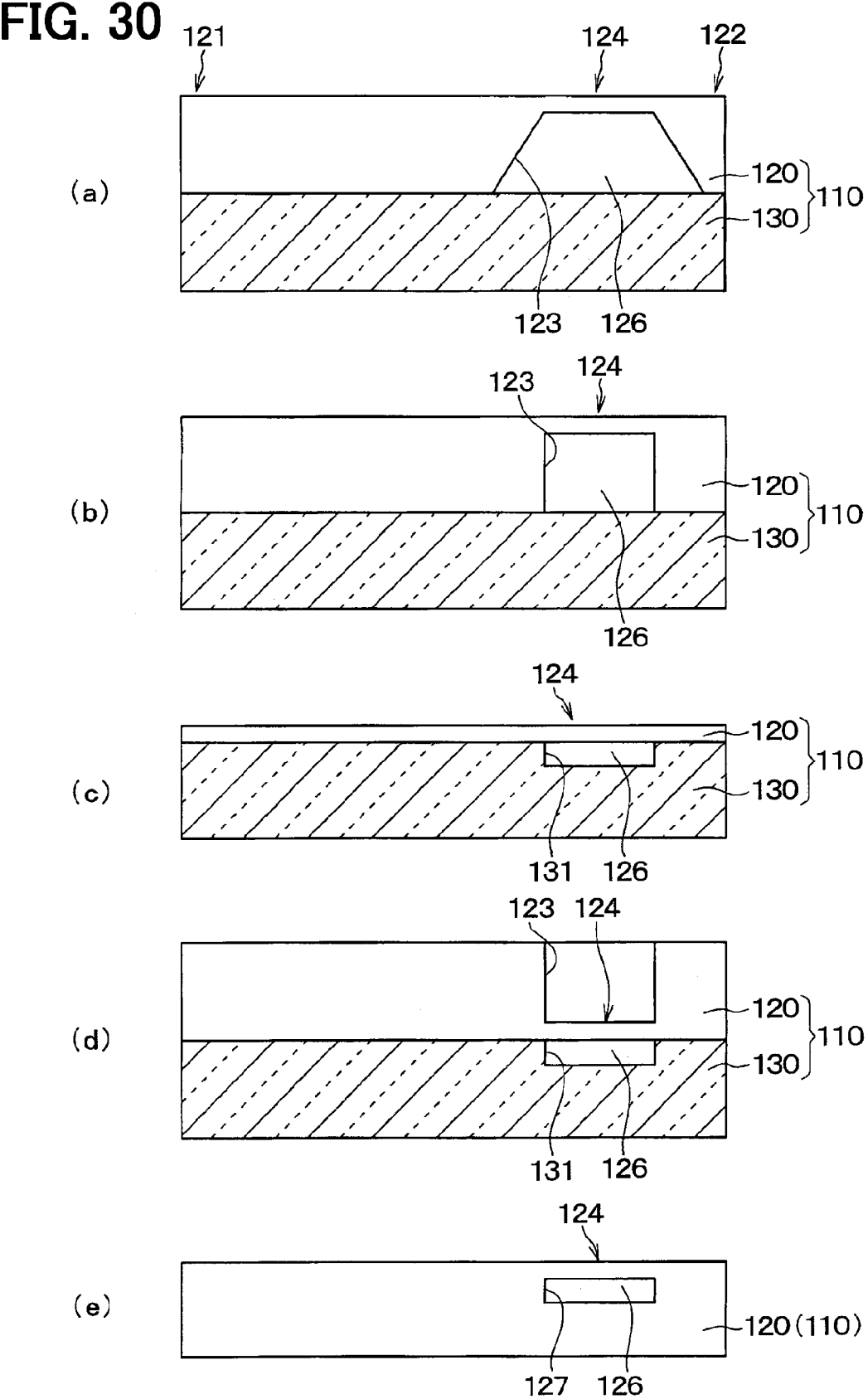
FIG. 30 is a diagram illustrating a cross sectional composition of a sensor section according to another embodiment of the present disclosure.

As shown in FIG. 30A, the recess 123 having a trapezoid-like cross section may be formed from the rear surface of the silicon substrate 120 to configure the diaphragm 124. Further, as shown in FIG. 30B, as a modification example of FIG. 30A, the recess 123 may have a rectangular cross section. In addition, as shown in FIG. 30C, the silicon substrate 120 may be made thin, the recess 131 may be formed in the base 130, and the diaphragm 124 may be formed in a region of the silicon substrate 120 that faces the recess 131. Further, as shown in FIG. 30D, as a modification example of FIG. 20(b), the cross section of the recess 123 formed from the front surface of the silicon substrate 120 may be a rectangular shape. Furthermore, as shown in FIG. 30E, the sensor section 110 may be formed only by the silicon substrate 120, and a cavity 127 that forms the pressure reference chamber 126 may be formed inside the silicon substrate 120. The silicon substrate 120 is, for example, manufactured by forming a recess on a front surface of a substrate formed of silicon, and then, forming an epitaxial layer on the substrate to block the recess using an LPCVD method or the like so that the cavity 127 is formed by the recess.

Further, in the first and second embodiments, an example in which the diaphragm 124 is the square shape is described, but the shape of the diaphragm 124 is not limited thereto. FIGS. 31A to 31D are enlarged plan views of the diaphragm 124 in other embodiments.

Figure 31:
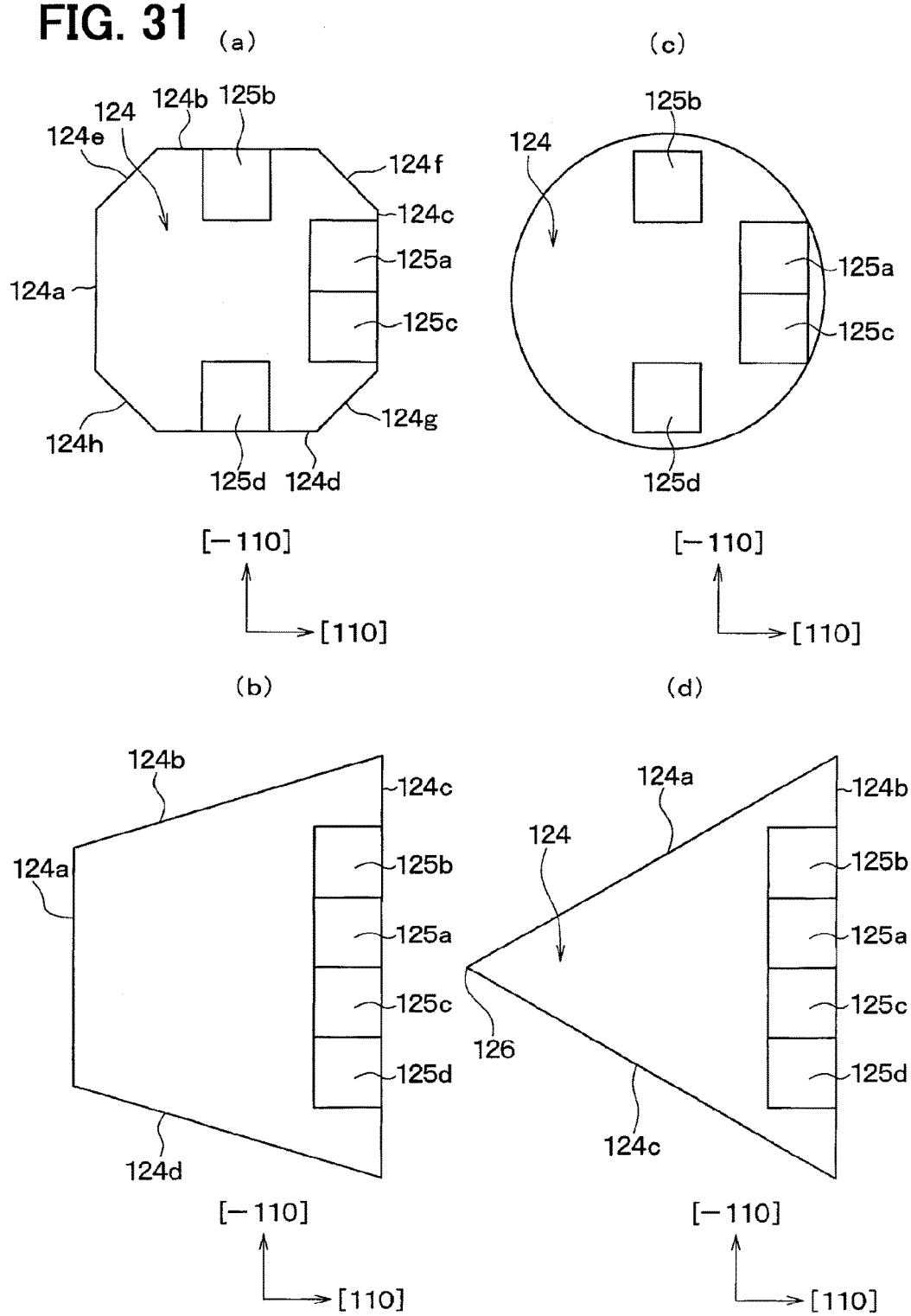
FIG. 31 is a plan view of a diaphragm according to another embodiment of the present disclosure.

As shown in FIG. 31A, the diaphragm 124 may be formed in an octagonal shape that has a first side 124*a* to a fourth side 124*d*, a fifth side 124*e* that connects the first side 124*a* and the second side 124*b*, a sixth side 124*f* that connects the second side 124*b* and the third side 124*c*, a seventh side 124*g* that connects the third side 124*c* and the fourth side 124*d*, and an eighth side 124*h* that connects the fourth side 124*d* and the first side 124*a*. In this case, for example, similar to the fourth embodiment, the first piezoresistive element 125*a* and the third piezoresistive element 125*c* may be formed adjacent to the third side 124*c*, the second piezoresistive element 125*b* may be formed adjacent to the central portion of the second side 124*b*, and the fourth piezoresistive element 125*d* may be formed adjacent to the central portion of the fourth side 124*d*.

As shown in FIG. 31B, the diaphragm 124 may be formed in a trapezoid-like shape that has the first side to the fourth side 124*a* to 124*d*, in which the first side 124*a* is shorter than the third side 124*c*. Although not shown particularly, a trapezoid-like shape in which the third side 124*c* is shorter than the first side 124*a* may be used. In this case, for example, similar to the fifth embodiment, the first piezoresistive element to the fourth piezoresistive element 125*a* to 125*d* may be formed adjacent to the third side 124*c*. Similar to the first embodiment, the second piezoresistive element 125*b* may be formed in the place adjacent to the central portion of the second side 124*b*, and the fourth piezoresistive element 125*d* may be formed in the place adjacent to the central portion of the fourth side 124*d*.

Further, as shown in FIG. 31C, the diaphragm 124 may be formed in a circular shape. In this case, the first piezoresistive element to the fourth piezoresistive element 125*a* to 125*d* may be formed in a region excluding a region around an intersection point placed on the side of the fixed end 121, among intersection points where a straight line that is parallel to the [110] direction and passes through the center of the diaphragm 124 intersects an outer contour line that forms the outer appearance of the diaphragm 124. That is, when the external temperature is changed, since the largest thermal stress is generated in a portion closest to the fixed end 121 in the diaphragm 124, the first piezoresistive element to the fourth piezoresistive element 125*a* to 125*d* may be formed in a region excluding the portion.

Specifically, in FIG. 31C, the first piezoresistive element 125*a* and the third piezoresistive element 125*c* are formed on the side of the free end 122 with reference to the center of the diaphragm 124, the second piezoresistive element 125*b* is formed on the side of the [−110] direction from the center on the [−110] axis that passes through the center, and the fourth piezoresistive element 125*d* is formed on the side of the [1-10] direction from the center.

Figure 32:
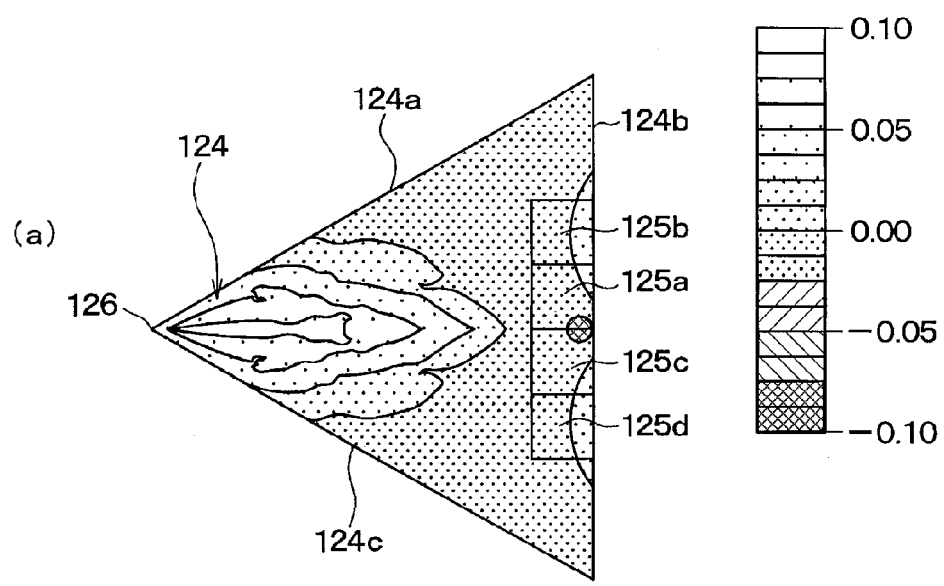
FIG. 32 shows a simulation result illustrating a thermal stress generated in a diaphragm according to another embodiment of the present disclosure.
Figure 32:
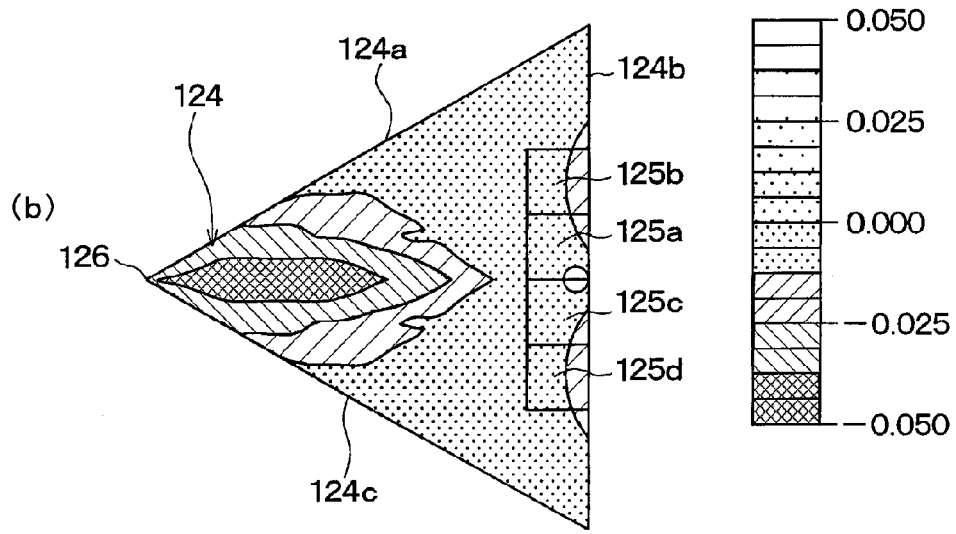

Further, as shown in FIG. 31D, the diaphragm 124 may be formed in a triangular shape that includes the first side to the third side 124*a* to 124*c*, and a vertical angle 126 on the side of the fixed end 121, in which the second side 124*b* is parallel to the [−110] direction. FIGS. 32A and 32B show simulation results indicating thermal stresses generated in the diaphragm according to the other embodiments. FIG. 32A shows a simulation result when the external temperature is 150° C. FIG. 32B shows a simulation result when the external temperature is −40° C. As shown in FIGS. 32A and 32B, when the external temperature is 150° C. or −40° C., the largest thermal stress is generated in the region around the vertical angle 126 in the diaphragm 124. Thus, as shown in FIG. 31D, the first piezoresistive element to the fourth piezoresistive element 125*a* to 125*d* may be formed in the region around the vertical angle 126 in the diaphragm 124, and for example, may be formed adjacent to the second side 124*b*, similar to the fifth embodiment.

Since the pressure sensor that includes the diaphragm 124 shown in FIGS. 31A to 31D as described above has a side that is not parallel to the [110] direction or the [−110] direction, the pressure sensor is not easily bent with reference to the axis of the [−110] direction or the [110] direction. Thus, the direction where the sensor section 110 is easily bent and the direction where the diaphragm 124 is easily bent are different from each other, and thus, the thermal stress generated in the diaphragm 124 can be reduced as described in the sixth embodiment.

FIGS. 31A to 31D show only examples of the positions where the first piezoresistive element to the fourth piezoresistive element 125*a* to 125*d* are formed. That is, as long as the first piezoresistive element to the fourth piezoresistive element 125*a* to 125*d* are formed in a region excluding the portion where the largest thermal stress is generated in the diaphragm 124 when the external temperature is changed, the reduction of detection accuracy can be suppressed, compared with the pressure sensor in the related art.

Figure 33:
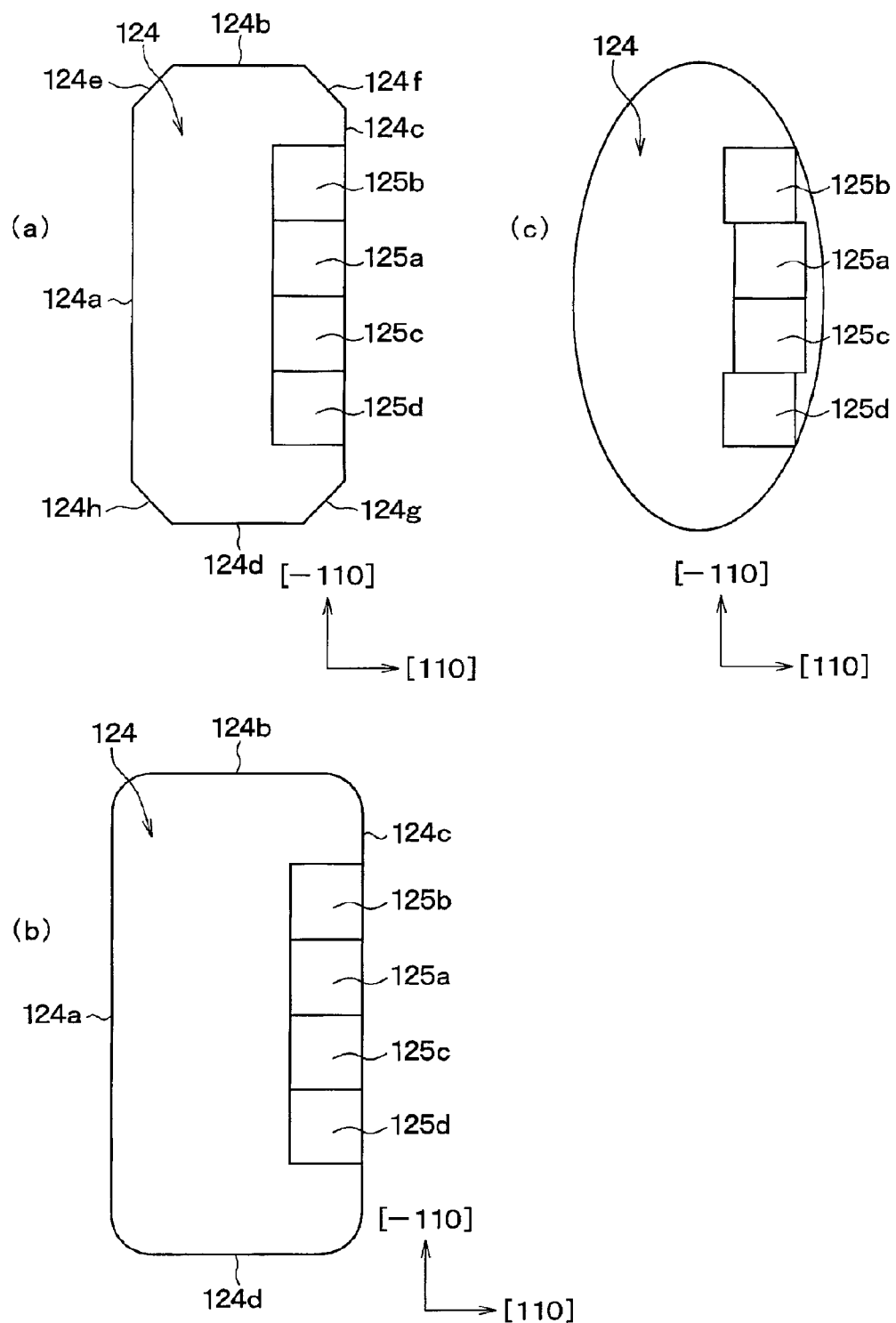
FIG. 33 is a plan view illustrating a diaphragm according to another embodiment of the present disclosure.

Further, in the sixth embodiment, an example in which the diaphragm 124 is formed in the rectangular shape of which the aspect ratio is larger than 1 is described, but the shape of the diaphragm 124 is not limited thereto. FIGS. 33A to 33C are enlarged plan views of the diaphragm 124 in other embodiments.

As shown in FIG. 33A, in the diaphragm 124 of an octagonal shape shown in FIG. 31A, the aspect ratio may be set to be equal to or larger than 1. In this case, the first piezoresistive element to the fourth piezoresistive element 125*a* to 125*d* may be formed adjacent to the third side 124*c*. Further, as shown in FIG. 33B, the diaphragm 124 shown in FIG. 25 may be formed in an approximately rectangular shape having roundness in the respective corner portions where the first side to the fourth side 124*a* to 124*d* are connected to each other. In addition, as shown in FIG. 33C, the diaphragm 124 shown in FIG. 31C may be formed in an elliptical shape of which the aspect ratio is 1 or greater. In this case, the first piezoresistive element to the fourth piezoresistive element 125*a* to 125*d* may be disposed on the side of the free end 122 with reference to the center of the diaphragm 124.

In FIGS. 31A to 31D and FIGS. 33A to 33C, a case where the main surface of the silicon substrate 120 is the (001) plane is described, but the shapes of the diaphragm 124 shown in FIGS. 31A to 31D and FIGS. 33A to 33C may be applied to a silicon substrate 120 of which the main surface is the (011) plane. In this case, for example, similar to the seventh embodiment, the first piezoresistive element 125*a* and the third piezoresistive element 125*c* among the first piezoresistive element to the fourth piezoresistive element 125*a* to 125*d* may be formed at the central portion of the diaphragm 124.

Further, in the above-described respective embodiments, an example in which the first piezoresistive element to the fourth piezoresistive element 125*a* to 125*d* that form the Wheatstone bridge (full bridge) circuit are formed in the diaphragm 124 is described, but for example, only the first piezoresistive element 125a and the second piezoresistive element 125b that form a half bridge circuit may be formed in the diaphragm 124.

Further, in the above-described respective embodiments, an example in which the first piezoresistive element to the fourth piezoresistive element 125a to 125d are configured so that the direction where the resistance value is changed when the stress is applied to the diaphragm 124 is the longitudinal direction is described, but for example, the first piezoresistive element to the fourth piezoresistive element 125a to 125d may be formed in a zigzag shape in which the direction where the resistance value is changed when the stress is applied to the diaphragm 124 is a width direction. Further, the first piezoresistive element to the fourth piezoresistive element 125a to 125d may not be formed in the zigzag shape, but for example, may be formed in a straight line shape.

The present disclosure has the following aspects.

According to a first aspect of the present disclosure, a pressure sensor includes: a sensor section having one direction as a longitudinal direction, one end in the longitudinal direction as a fixed end, and the other end as a free end opposite to the one end, and including a thin diaphragm and a first gauge resistor to a fourth gauge resistor that are disposed on the diaphragm to form a bridge circuit; and a support member that fixes the one end of the sensor section. A first pair to a fourth pair of piezoresistive elements are disposed on the diaphragm. Each of the piezoresistive elements has a resistance value change direction indicating a direction, in which a resistance value increases or decreases according to an applied force. Two piezoresistive elements of each pair have opposite resistance value change directions. The first pair includes a first piezoresistive element and a fifth piezoresistive element, the second pair includes a second piezoresistive element and a sixth piezoresistive element, the third pair includes a third piezoresistive element and a seventh piezoresistive element, and the fourth pair includes a fourth piezoresistive element and an eighth piezoresistive element. Distances between piezoresistive elements of the first pair and the second pair and the support member are equal to each other. Distances between piezoresistive elements of the third pair and the fourth pair and the support member are longer than the distances between piezoresistive elements of the first pair and the second pair and the support member, and are equal to each other. The first gauge resistor includes a combined resistance, which is provided by serially connecting the first piezoresistive element and the eighth piezoresistive element, and the first piezoresistive element and the eighth piezoresistive element have a same resistance value change direction. The second gauge resistor includes a combined resistance, which is provided by serially connecting the second piezoresistive element and the seventh piezoresistive element, and the second piezoresistive element and the seventh piezoresistive element have a same resistance value change direction. The third gauge resistor includes a combined resistance, which is provided by serially connecting the third piezoresistive element and the sixth piezoresistive element, and the third piezoresistive element and the sixth piezoresistive element have a same resistance value change direction. The fourth gauge resistor includes a combined resistance, which is provided by serially connecting the fourth piezoresistive element and the fifth piezoresistive element, and the fourth piezoresistive element and the fifth piezoresistive element have a same resistance value change direction.

In the pressure sensor, each of the first gauge resistor to the fourth gauge resistor is formed by a combined resistance in which a piezoresistive element to which a large thermal stress is applied and a piezoresistive element to which a small thermal stress is applied are serially connected to each other. Thus, when the thermal stress is generated in the diaphragm, the difference between the sizes of the thermal stresses applied to the first gauge resistor to the fourth gauge resistor can be reduced. Accordingly, the difference between the sizes of resistance value changes due to the thermal stresses of the first gauge resistor to the fourth gauge resistor can be reduced, and the occurrence of a non-linear sensor signal can be suppressed (FIG. 12).

Alternatively, the diaphragm may have a shape with a first side of an outer contour line that orthogonally intersects the longitudinal direction. The first side is disposed on a one end side. Each piezoresistive element is disposed in a predetermined region excluding a region around a middle point of the first side of the diaphragm. In this case, the thermal stresses applied to the first piezoresistive element to the eighth piezoresistive element can be reduced, and the occurrence of the non-linear sensor signal can be suppressed.

Alternatively, the sensor section may include a silicon substrate and has a rectangular parallelepiped shape. The diaphragm is arranged in the silicon substrate. The diaphragm has a polygonal shape with an outer contour line having the first side, and a second side to a fourth side. The longitudinal direction is defined as a first direction, and a direction orthogonal to the longitudinal direction is defined as a second direction. The first side and a third side that face each other are parallel to the second direction, and a second side and the fourth side that face each other are parallel to the first direction. The first side is disposed on a fixed end side.

Alternatively, the silicon substrate may have a main surface that is a plane. The first pair of piezoresistive elements is formed adjacent to a central portion of the second side of the diaphragm. The second pair of piezoresistive elements is formed adjacent to a central portion of the fourth side of the diaphragm. The third pair and the fourth pair of piezoresistive elements are formed adjacent to a central portion of the third side of the diaphragm.

Alternatively, the silicon substrate may have a main surface that is a plane. The first pair and the second pair of piezoresistive elements are formed at a central portion of the diaphragm. The third pair and the fourth pair of piezoresistive elements are formed adjacent to a central portion of the third side of the diaphragm.

Alternatively, a ratio of a length of the first side to a length of the second side may be defined as an aspect ratio. The aspect ratio is equal to or larger than 1. In this case, the thermal stress generated in the diaphragm can be reduced, and the thermal stresses applied to the first piezoresistive element to the eighth piezoresistive element can be reduced. Thus, the occurrence of the non-linear sensor signal can further be suppressed.

Alternatively, the diaphragm may be symmetrical with reference to an axis that passes through a center of the sensor section and is parallel to the longitudinal direction.

Alternatively, each of the piezoresistive elements may have a zigzag shape with straight segments and bending portions, each of which is bent from an end part of a respective straight segment. A region surrounded by overlapped straight segments has a square shape. The regions of the respective piezoresistive elements are same size.

According to a second aspect of the present disclosure, a pressure sensor includes: a sensor section having one direction as a longitudinal direction, one end in the longitudinal direction as a fixed end, and the other end as a free end opposite to the one end, and including a thin diaphragm and a plurality of piezoresistive elements that is disposed on the diaphragm to provide a bridge circuit; and a support member that fixes the one end of the sensor section. The diaphragm has a shape having a first side of an outer contour line that orthogonally intersects the longitudinal direction. The first side is disposed on an one end side. The plurality of piezoresistive elements are disposed in a predetermined region other than a region around a middle point of the first side of the diaphragm.

In the pressure sensor with such a configuration, since the diaphragm has an outer appearance having one side on one end side, when an external temperature is changed, the largest thermal stress is generated in a region (central portion) around a middle point of the one side, but the piezoresistive elements are formed in a region excluding the region around the middle point of one side. Thus, compared with the pressure sensor in the related art in which the piezoresistive elements are formed in the portion where the largest thermal stress is generated when the external temperature is changed, the difference of the thermal stresses applied to the respective piezoresistive elements can be reduced, and the reduction of pressure detection accuracy can be suppressed.

Further, in the pressure sensor with such a configuration, the detection signal output from the bridge circuit is amplified by a predetermined multiple using an amplifier circuit, and the pressure is measured based on the amplified signal. Thus, an error of the amplified signal becomes larger as an absolute value of the maximum value of the thermal stresses applied to the respective piezoresistive elements becomes larger. However, in the pressure sensor, since the piezoresistive elements are formed in the region excluding the region around the middle point of the one side, when the external temperature is changed, the absolute value of the maximum value of the thermal stresses applied to the piezoresistive elements can be reduced. Thus, the reduction of pressure detection accuracy can further be suppressed.

Alternatively, the sensor section may include a silicon substrate and has a rectangular parallelepiped shape. The diaphragm is formed in the silicon substrate. The diaphragm has a polygonal shape having the outer contour line including the first side and a second side to a fourth side. The longitudinal direction is defined as a first direction, and a direction orthogonal to the longitudinal direction is defined as a second direction. The first side and the third side that face each other are parallel to the second direction, and the second side and the fourth side that face each other are parallel to the first direction. The first side is disposed on a fixed end side.

Further, the silicon substrate may have a main surface that is a plane. The plurality of piezoresistive elements include a first piezoresistive element to a fourth piezoresistive element. The first piezoresistive element and a third piezoresistive element are formed adjacent to a central portion of the third side of the diaphragm. The second piezoresistive element is formed adjacent to a central portion of the second side of the diaphragm. The fourth piezoresistive element is formed adjacent to a central portion of the fourth side of the diaphragm.

In the pressure sensor with such a configuration, since the main surface of the silicon substrate is the plane, the central portions of the first side to the fourth side are easily distorted when pressure is applied to the diaphragm. Thus, the reduction of pressure detection accuracy can be suppressed while approximately maintaining the sensitivity, compared with the pressure sensor in the related art.

Alternatively, the silicon substrate may have a main surface that is a plane. The plurality of piezoresistive elements include a first piezoresistive element to a fourth piezoresistive element. The first piezoresistive element to the fourth piezoresistive element are formed adjacent to the third side of the diaphragm. The first piezoresistive element and a third piezoresistive element are serially connected to each other through a second piezoresistive element interposed therebetween. The first piezoresistive element and the third piezoresistive element are serially connected to each other through the fourth piezoresistive element interposed therebetween. The first piezoresistive element and the third piezoresistive element include a resistance value change portion having a resistance value, which is changed when a pressure is applied to the diaphragm, respectively. The resistance value change portion of the first piezoresistive element and the resistance value change portion of the third piezoresistive element extend in the first direction. The second piezoresistive element and the fourth piezoresistive element include a resistance value change portion having a resistance value, which is changed when the pressure is applied to the diaphragm, respectively. The resistance value change portion of the second piezoresistive element and the resistance value change portion of the fourth piezoresistive element extend in the second direction.

In the pressure sensor with such a configuration, the first piezoresistive element to the fourth piezoresistive element are formed adjacent to the third side most distant from the fixed end. Thus, the difference between the thermal stresses applied to the first piezoresistive element to the fourth piezoresistive element can be reduced, and the reduction of pressure detection accuracy can be suppressed.

Alternatively, the silicon substrate may have a main surface that is a plane. The plurality of piezoresistive elements include a first piezoresistive element to a fourth piezoresistive element. The first piezoresistive element and a third piezoresistive element are formed in a central portion of the diaphragm. A second piezoresistive element and the fourth piezoresistive element are formed adjacent to a central portion of the third side of the diaphragm.

Alternatively, a ratio of a length of the first side and a length of the second side may be defined as an aspect ratio. The aspect ratio is equal to or larger than 1.

In the pressure sensor with such a configuration, when the external temperature is changed, the thermal stress generated in the diaphragm can be reduced, and the reduction of pressure detection accuracy can be suppressed.

According to a third aspect of the present disclosure, a pressure sensor includes: a sensor section having one direction as a longitudinal direction, one end in the longitudinal direction as a fixed end, and the other end as a free end opposite to the one end, and including a thin diaphragm and a plurality of piezoresistive elements that is disposed on the diaphragm to form a bridge circuit; and a support member that fixes the one end of the sensor section. The diaphragm has a circular outer contour line. A straight line, which is parallel to the longitudinal direction and passes through a center of the diaphragm, intersects an outer contour line of the diaphragm at two intersections. The plurality of piezoresistive elements is disposed in a predetermined region excluding a region around an intersection positioned on a fixed end side.

In the pressure sensor with such a configuration, the difference between the thermal stresses applied to the respective piezoresistive elements can be reduced, and the reduction of pressure detection accuracy can be suppressed.

Further, in the pressure sensor with such a configuration, when the external temperature is changed, the absolute value of the maximum value of the thermal stresses applied to the piezoresistive elements can be reduced. Thus, the reduction of pressure detection accuracy can further be suppressed.

Alternatively, the outer contour line of the diaphragm may be an elliptical shape, which has a length in a direction orthogonal to the longitudinal direction is longer than a length in the longitudinal direction.

In the pressure sensor with such a configuration, the thermal stress generated in the diaphragm can be reduced, and the reduction of pressure detection accuracy can be suppressed.

According to a fourth aspect of the present disclosure, a pressure sensor includes: a sensor section having one direction as a longitudinal direction, one end in the longitudinal direction as a fixed end, and the other end as a free end opposite to the one end, and including a thin diaphragm and a plurality of piezoresistive elements that is disposed on the diaphragm to form a bridge circuit; and a support member that fixes the one end of the sensor section. The diaphragm has an outer contour line of a triangular shape. The triangular shape has a vertical angle with a first side to a third side. The vertical angle is disposed on a one end side. The plurality of piezoresistive elements is disposed in a predetermined region excluding a region around the vertical angle.

In the pressure sensor with such a configuration, the difference between the thermal stresses applied to the respective piezoresistive elements can be reduced, and the reduction of pressure detection accuracy can be suppressed.

Further, in the pressure sensor with such a configuration, when the external temperature is changed, the absolute value of the maximum value of the thermal stresses applied to the piezoresistive elements can be reduced. Thus, the reduction of pressure detection accuracy can further be suppressed.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A pressure sensor comprising:
   a sensor section having one direction as a longitudinal direction, one end in the longitudinal direction as a fixed end, and the other end as a free end opposite to the one end, and including a thin diaphragm and a plurality of piezoresistive elements that is disposed on the diaphragm to provide a bridge circuit; and
   a support member that fixes the one end of the sensor section,
   wherein the diaphragm has a shape having a first side of an outer contour line that orthogonally intersects the longitudinal direction,
   wherein the first side is disposed on an one end side, and
   wherein the plurality of piezoresistive elements are disposed in a predetermined region other than a region around a middle point of the first side of the diaphragm.

2. The pressure sensor according to claim 1,
   wherein the sensor section includes a silicon substrate and has a rectangular parallelepiped shape,
   wherein the diaphragm is formed in the silicon substrate,
   wherein the diaphragm has a polygonal shape having the outer contour line including the first side and a second side to a fourth side,
   wherein the longitudinal direction is defined as a first direction, and a direction orthogonal to the longitudinal direction is defined as a second direction,
   wherein the first side and the third side that face each other are parallel to the second direction, and the second side and the fourth side that face each other are parallel to the first direction, and
   wherein the first side is disposed on a fixed end side.

3. The pressure sensor according to claim 2,
   wherein the silicon substrate has a main surface that is a plane,
   wherein the plurality of piezoresistive elements include a first piezoresistive element to a fourth piezoresistive element,
   wherein the first piezoresistive element and a third piezoresistive element are formed adjacent to a central portion of the third side of the diaphragm,
   wherein the second piezoresistive element is formed adjacent to a central portion of the second side of the diaphragm, and
   wherein the fourth piezoresistive element is formed adjacent to a central portion of the fourth side of the diaphragm.

4. The pressure sensor according to claim 2,
   wherein the silicon substrate has a main surface that is a plane,
   wherein the plurality of piezoresistive elements include a first piezoresistive element to a fourth piezoresistive element,
   wherein the first piezoresistive element to the fourth piezoresistive element are formed adjacent to the third side of the diaphragm,
   wherein the first piezoresistive element and a third piezoresistive element are serially connected to each other through a second piezoresistive element interposed therebetween,
   wherein the first piezoresistive element and the third piezoresistive element are serially connected to each other through the fourth piezoresistive element interposed therebetween,
   wherein the first piezoresistive element and the third piezoresistive element include a resistance value change portion having a resistance value, which is changed when a pressure is applied to the diaphragm, respectively,
   wherein the resistance value change portion of the first piezoresistive element and the resistance value change portion of the third piezoresistive element extend in the first direction,
   wherein the second piezoresistive element and the fourth piezoresistive element include a resistance value change portion having a resistance value, which is changed when the pressure is applied to the diaphragm, respectively, and
   wherein the resistance value change portion of the second piezoresistive element and the resistance value change portion of the fourth piezoresistive element extend in the second direction.

5. The pressure sensor according to claim 2,
   wherein the silicon substrate has a main surface that is a plane,
   wherein the plurality of piezoresistive elements include a first piezoresistive element to a fourth piezoresistive element, wherein the first piezoresistive element and a third piezoresistive element are formed in a central portion of the diaphragm, and wherein a second piezoresistive element and the fourth piezoresistive element are formed adjacent to a central portion of the third side of the diaphragm.

6. The pressure sensor according to claim 2, wherein a ratio of a length of the first side and a length of the second side is defined as an aspect ratio, and wherein the aspect ratio is equal to or larger than 1.

7. A pressure sensor comprising:

a sensor section having one direction as a longitudinal direction, one end in the longitudinal direction as a fixed end, and the other end as a free end opposite to the one end, and including a thin diaphragm and a plurality of piezoresistive elements that is disposed on the diaphragm to form a bridge circuit; and a support member that fixes the one end of the sensor section, wherein the diaphragm has a circular outer contour line, wherein a straight line, which is parallel to the longitudinal direction and passes through a center of the diaphragm, intersects an outer contour line of the diaphragm at two intersections, and wherein the plurality of piezoresistive elements is disposed in a predetermined region excluding a region around an intersection positioned on a fixed end side.

8. The pressure sensor according to claim 7, wherein the outer contour line of the diaphragm is an elliptical shape, which has a length in a direction orthogonal to the longitudinal direction is longer than a length in the longitudinal direction.

9. A pressure sensor comprising:

a sensor section having one direction as a longitudinal direction, one end in the longitudinal direction as a fixed end, and the other end as a free end opposite to the one end, and including a thin diaphragm and a plurality of piezoresistive elements that is disposed on the diaphragm to form a bridge circuit; and a support member that fixes the one end of the sensor section, wherein the diaphragm has an outer contour line of a triangular shape, wherein the triangular shape has a vertical angle with a first side to a third side, wherein the vertical angle is disposed on a one end side, and wherein the plurality of piezoresistive elements is disposed in a predetermined region excluding a region around the vertical angle.

10. A pressure sensor comprising:

a sensor section having one direction as a longitudinal direction, one end in the longitudinal direction as a fixed end, and the other end as a free end opposite to the one end, and including a thin diaphragm and a first gauge resistor to a fourth gauge resistor that are disposed on the diaphragm to form a bridge circuit; and a support member that fixes the one end of the sensor section, wherein a first pair to a fourth pair of piezoresistive elements are disposed on the diaphragm, wherein each of the piezoresistive elements has a resistance value change direction indicating a direction, in which a resistance value increases or decreases according to an applied force, wherein two piezoresistive elements of each pair have opposite resistance value change directions, wherein the first pair includes a first piezoresistive element and a fifth piezoresistive element, the second pair includes a second piezoresistive element and a sixth piezoresistive element, the third pair includes a third piezoresistive element and a seventh piezoresistive element, and the fourth pair includes a fourth piezoresistive element and an eighth piezoresistive element, wherein distances between piezoresistive elements of the first pair and the second pair and the support member are equal to each other, wherein distances between piezoresistive elements of the third pair and the fourth pair and the support member are longer than the distances between piezoresistive elements of the first pair and the second pair and the support member, and are equal to each other, wherein the first gauge resistor includes a combined resistance, which is provided by serially connecting the first piezoresistive element and the eighth piezoresistive element, and the first piezoresistive element and the eighth piezoresistive element have a same resistance value change direction, wherein the second gauge resistor includes a combined resistance, which is provided by serially connecting the second piezoresistive element and the seventh piezoresistive element, and the second piezoresistive element and the seventh piezoresistive element have a same resistance value change direction, wherein the third gauge resistor includes a combined resistance, which is provided by serially connecting the third piezoresistive element and the sixth piezoresistive element, and the third piezoresistive element and the sixth piezoresistive element have a same resistance value change direction, and wherein the fourth gauge resistor includes a combined resistance, which is provided by serially connecting the fourth piezoresistive element and the fifth piezoresistive element, and the fourth piezoresistive element and the fifth piezoresistive element have a same resistance value change direction.

11. The pressure sensor according to claim 10, wherein the diaphragm has a shape with a first side of an outer contour line that orthogonally intersects the longitudinal direction, wherein the first side is disposed on a one end side, and wherein each piezoresistive element is disposed in a predetermined region excluding a region around a middle point of the first side of the diaphragm.

12. The pressure sensor according to claim 11, wherein the sensor section includes a silicon substrate and has a rectangular parallelepiped shape, wherein the diaphragm is arranged in the silicon substrate, wherein the diaphragm has a polygonal shape with an outer contour line having the first side, and a second side to a fourth side, wherein the longitudinal direction is defined as a first direction, and a direction orthogonal to the longitudinal direction is defined as a second direction, wherein the first side and a third side that face each other are parallel to the second direction, and a second side and the fourth side that face each other are parallel to the first direction, and wherein the first side is disposed on a fixed end side.

13. The pressure sensor according to claim 12, wherein the silicon substrate has a main surface that is a plane, wherein the first pair of piezoresistive elements is formed adjacent to a central portion of the second side of the diaphragm, wherein the second pair of piezoresistive elements is formed adjacent to a central portion of the fourth side of the diaphragm, and wherein the third pair and the fourth pair of piezoresistive elements are formed adjacent to a central portion of the third side of the diaphragm.

14. The pressure sensor according to claim 12, wherein the silicon substrate has a main surface that is a plane, wherein the first pair and the second pair of piezoresistive elements are formed at a central portion of the diaphragm, and wherein the third pair and the fourth pair of piezoresistive elements are formed adjacent to a central portion of the third side of the diaphragm.

15. The pressure sensor according to claim 12, wherein a ratio of a length of the first side to a length of the second side is defined as an aspect ratio, and wherein the aspect ratio is equal to or larger than 1.

16. The pressure sensor according to claim 10, wherein the diaphragm is symmetrical with reference to an axis that passes through a center of the sensor section and is parallel to the longitudinal direction.

17. The pressure sensor according to claim 10, wherein each of the piezoresistive elements has a zigzag shape with straight segments and bending portions, each of which is bent from an end part of a respective straight segment, wherein a region surrounded by overlapped straight segments has a square shape, and wherein the regions of the respective piezoresistive elements are same size.

\* \* \* \* \*